United States Patent
Howes et al.

(10) Patent No.: US 10,290,025 B1
(45) Date of Patent: May 14, 2019

(54) CONTROLLING IMPRESSION DELIVERY PACING FOR MULTIPLE GEOGRAPHIC REGIONS ASSOCIATED WITH AN ONLINE CAMPAIGN IN A REAL-TIME BIDDING ENVIRONMENT

(71) Applicant: MaxPoint Interactive, Inc., Morrisville, NC (US)

(72) Inventors: Joshua Howes, Raleigh, NC (US); Evan Wyse, Raleigh, NC (US)

(73) Assignee: MAXPOINT INTERACTIVE, INC., Morrisville, NC (US)

( * ) Notice: Subject to any disclaimer, the term of this patent is extended or adjusted under 35 U.S.C. 154(b) by 198 days.

(21) Appl. No.: 15/261,004

(22) Filed: Sep. 9, 2016

Related U.S. Application Data

(63) Continuation-in-part of application No. 14/605,681, filed on Jan. 26, 2015, now Pat. No. 9,747,618, which is a continuation of application No. 14/455,535, filed on Aug. 8, 2014, which is a continuation-in-part of application No. 14/133,553, filed on Dec. 18, 2013.

(Continued)

(51) Int. Cl.
 *G06Q 30/02* (2012.01)
(52) U.S. Cl.
 CPC ..... *G06Q 30/0275* (2013.01); *G06Q 30/0261* (2013.01)
(58) Field of Classification Search
 CPC .................................. G06Q 30/0207–30/0277
 See application file for complete search history.

(56) References Cited

U.S. PATENT DOCUMENTS

| | | | | |
|---|---|---|---|---|
| 7,676,578 B1 * | 3/2010 | Zhu | ...................... | G06F 11/3409 370/232 |
| 7,734,505 B2 * | 6/2010 | Miller | ................ | G06Q 30/0601 705/26.3 |

(Continued)

OTHER PUBLICATIONS

Adaptive Control Using Heisenberg Bidding, Karlsson, Niklas; 2014 American Control Conference, Jun. 2014.*

(Continued)

*Primary Examiner* — David J Stoltenberg
(74) *Attorney, Agent, or Firm* — Slayden Grubert Beard PLLC

(57) ABSTRACT

A method is provided for dynamically controlling the pace of online impression delivery among multiple geographic regions in a real-time bidding (RTB) system. Target geographic locations associated with a campaign are identified, and target geographic regions associated with each target geographic location are identified. A pacing score is determined for each target geographic region. The bidding system makes bidding decisions regarding RTB bid requests received from an RTB exchange based at least on whether the respective bid request is associated with a target geographic region, and if so, the pacing score for that target geographic region. A campaign-related impression is delivered for each winning bid, and impression delivery data is stored for each target geographic region. The bidding system automatically adjusts the pacing score for each target geographic region based on the stored impression delivery data for that geographic region, and uses the adjusted pacing scores for subsequent bidding decisions.

11 Claims, 13 Drawing Sheets

Related U.S. Application Data

(60) Provisional application No. 62/240,936, filed on Oct. 13, 2015.

(56) References Cited

U.S. PATENT DOCUMENTS

| | | | | |
|---|---|---|---|---|
| 8,249,917 B1* | 8/2012 | Kassmann | ......... | G06Q 30/0601 705/12 |
| 8,799,062 B1* | 8/2014 | Epperson | ......... | G06Q 30/0269 705/14.1 |
| 8,825,662 B1* | 9/2014 | Kingman | ......... | G06Q 30/0251 707/741 |
| 8,983,860 B1* | 3/2015 | Beda, III | ......... | G06Q 30/0275 705/14.49 |
| 9,213,953 B1* | 12/2015 | Kassmann | ......... | G06Q 10/0631 |
| 2003/0174651 A1* | 9/2003 | Morton | ......... | H04L 45/00 370/235 |
| 2005/0050027 A1* | 3/2005 | Yeh | ......... | G06F 17/3087 |
| 2006/0224496 A1* | 10/2006 | Sandholm | ......... | G06Q 30/02 705/37 |
| 2007/0288350 A1* | 12/2007 | Bykowsky | ......... | G06Q 30/0273 705/37 |
| 2008/0208659 A1* | 8/2008 | An | ......... | G06Q 10/06315 705/7.25 |
| 2008/0243824 A1* | 10/2008 | Riise | ......... | G06F 17/30241 |
| 2009/0119172 A1* | 5/2009 | Soloff | ......... | G06Q 30/02 705/344 |
| 2010/0042485 A1* | 2/2010 | Wang | ......... | G06Q 30/02 705/14.5 |
| 2010/0050171 A1* | 2/2010 | Liang | ......... | G05B 11/011 718/1 |
| 2010/0262455 A1* | 10/2010 | Karlsson | ......... | G06Q 30/02 705/14.45 |
| 2010/0262497 A1* | 10/2010 | Karlsson | ......... | G06Q 30/02 705/14.71 |
| 2011/0035259 A1* | 2/2011 | Das | ......... | G06Q 30/02 705/14.41 |
| 2011/0040612 A1* | 2/2011 | Simmons | ......... | G06Q 30/02 705/14.42 |
| 2011/0040635 A1* | 2/2011 | Simmons | ......... | G06Q 30/02 705/14.71 |
| 2011/0191170 A1* | 8/2011 | Zhang | ......... | G06Q 30/0247 705/14.46 |
| 2011/0276392 A1* | 11/2011 | Vaver | ......... | G06Q 30/02 705/14.43 |
| 2012/0053991 A1* | 3/2012 | Shimizu | ......... | G06Q 30/02 705/7.34 |
| 2012/0136728 A1* | 5/2012 | Hsiung | ......... | G06Q 30/0275 705/14.71 |
| 2012/0158496 A1* | 6/2012 | Solomon | ......... | G06Q 30/0251 705/14.49 |
| 2012/0166416 A1* | 6/2012 | Murdock | ......... | G06F 17/3087 707/711 |
| 2012/0253926 A1* | 10/2012 | Chen | ......... | G06Q 10/06 705/14.49 |
| 2012/0323674 A1* | 12/2012 | Simmons | ......... | G06Q 30/02 705/14.41 |
| 2013/0055309 A1* | 2/2013 | Dittus | ......... | H04N 21/2668 725/35 |
| 2013/0124308 A1* | 5/2013 | Hegeman | ......... | G06Q 10/04 705/14.48 |
| 2013/0197994 A1* | 8/2013 | Karlsson | ......... | G06Q 30/0241 705/14.45 |
| 2013/0238425 A1* | 9/2013 | Saldanha | ......... | G06Q 30/02 705/14.48 |
| 2013/0346218 A1* | 12/2013 | Liu | ......... | G06Q 30/02 705/14.71 |
| 2014/0006141 A1* | 1/2014 | Vassilvitskii | ......... | G06Q 30/0241 705/14.45 |
| 2014/0089106 A1* | 3/2014 | Jordan | ......... | G06Q 30/0202 705/14.71 |
| 2014/0100944 A1* | 4/2014 | Zhu | ......... | G06Q 30/02 705/14.41 |
| 2014/0123173 A1* | 5/2014 | Mak | ......... | H04N 21/44016 725/32 |
| 2014/0172573 A1* | 6/2014 | Saurabh | ......... | G06Q 30/0261 705/14.58 |
| 2014/0236725 A1* | 8/2014 | Golden | ......... | G06Q 30/0261 705/14.58 |
| 2014/0278981 A1* | 9/2014 | Mersov | ......... | G06Q 30/02 705/14.53 |
| 2015/0020126 A1* | 1/2015 | Kegel | ......... | G06F 17/30029 725/87 |
| 2015/0073920 A1* | 3/2015 | Pashkevich | ......... | G06Q 30/0275 705/14.71 |
| 2015/0088665 A1* | 3/2015 | Karlsson | ......... | G06Q 30/0275 705/14.71 |
| 2015/0170222 A1* | 6/2015 | Els | ......... | G06Q 30/0275 705/14.71 |
| 2015/0332349 A1* | 11/2015 | Els | ......... | G06Q 30/0275 705/14.71 |
| 2016/0042407 A1* | 2/2016 | Els | ......... | G06Q 30/0275 705/14.71 |
| 2016/0180373 A1* | 6/2016 | Xu | ......... | G06Q 30/0244 705/14.43 |
| 2016/0265789 A1* | 9/2016 | Faraldi | ......... | A47L 15/4418 |

OTHER PUBLICATIONS

Real Time Bidding with Smooth Budget Delivery in Online Advertising, Lee et al., ADKDD 2013, Aug. 11, 2013.*
Applications of Feedback Control in Online Advertising, Karlsson et al., 2013 American Control Conference, Jun. 2013.*
Optimal Real Time Bidding for Display Advertising, Zhang et al., KDD 2014, Aug. 2014.*
Real-Time Bidding for Online Advertising:Measurement and Analysis, Yuan et al., Jun. 2013.*

* cited by examiner

CONTROLLING IMPRESSION DELIVERY PACING FOR MULTIPLE GEOGRAPHIC REGIONS ASSOCIATED WITH AN ONLINE CAMPAIGN IN A REAL-TIME BIDDING ENVIRONMENT

RELATED APPLICATIONS

This application is a continuation-in-part of pending U.S. patent application Ser. No. 14/605,681, filed on Jan. 26, 2015, which is a continuation of Ser. No. 14/455,535, filed on Aug. 8, 2014, which is continuation-in-part of pending U.S. patent application Ser. No. 14/133,553, filed on Dec. 18, 2013. This application also claims priority to U.S. Provisional Application Ser. No. 62/240,936, filed on Oct. 13, 2015. The entire contents of all applications listed above are hereby incorporated by reference.

TECHNICAL FIELD

The present disclosure relates in general to the field of bidding on online placements in a real-time bidding (RTB) environment, and in particular, to systems and methods for controlling the pace of online impression purchasing and delivery for multiple different geographic regions (e.g., associated with one or more target stores) in a real-time bidding system.

BACKGROUND

Online advertisement placements generally refer to the slots or space on the pages of a website that are available for displaying advertisements along with their content. Advertisers typically bid on these advertisement placements that are made available through real-time bidding (RTB) exchanges such as AdX, Admeld, Pubmatic, etc.

From a mechanical perspective, online advertisement placement requires a bidding server connected to RTB exchanges. The bidding server then receives bid requests via the RTB exchanges. A bid request occurs when a user/Internet surfer visits a website or publisher that is selling their advertisement space on an RTB exchange. Upon receiving a bid request, the bidding server has a very short period of time to respond to this request (generally under 50 ms). Since this bid response needs to occur in a very short period of time, it is difficult to run large scale models to predict what advertisements to buy and what price to pay for them.

At bid time, the bidding server has to act on some set of rules, models or system instructions that indicate which bid requests it should bid or pass on. This is a non-trivial problem since there are numerous (e.g., billions) requests that could be bought at any given time, those requests are very different and occur randomly throughout the day, and each request needs to be evaluated in milliseconds.

SUMMARY

Methods and systems are disclosed for controlling the pace of online impression delivery for multiple different geographic regions (e.g., associated with one or more target stores) in a real-time bidding system.

One embodiment provides a method for dynamically controlling the pace of impression delivery among multiple geographic regions in a network-based real-time bidding (RTB) system. A bidding system identifies one or more target geographic locations associated with a particular campaign. The bidding system identifies one or more target geographic regions associated with each target geographic location. bidding system determines a pacing score for each target geographic region associated with each target geographic location. The bidding system receives a series of RTB bid requests at the bidding system from an RTB exchange via a communications network, each RTB bid request including (a) placement information identifying an online placement in digital content being loaded or rendered by an end user device and (b) identification information. The bidding system executes a bidding algorithm for each received RTB bid request. The bidding algorithm includes: identifying a geographic region associated with the bid request based on the identification information in the bid request; determining whether the identified geographic region is a target geographic region for the particular campaign; and if the identified geographic region is a target geographic region for the particular campaign, determining whether to submit a bid based at least on the pacing score for the identified geographic region. Winning bids are submitted for at least one received RTB bid request, each winning bid resulting in an impression delivery to a respective end user device. The bidding system may store, in memory, impression delivery data at least one target geographic region for the particular campaign, the stored impression delivery data indicating a volume of impressions delivered to each respective target geographic region. The bidding system automatically adjusts the pacing score for a particular target geographic region based on the stored impression delivery data for the particular target geographic region. The bidding system subsequently receives an RTB bid request associated with the particular target geographic region, and determines whether to submit a bid on the subsequent RTB bid request based at least on the adjusted pacing score for the target geographic region.

Another embodiment provides a bidding system for dynamically controlling the pace of impression delivery among multiple geographic regions in a network-based real-time bidding (RTB) system. The bidding system may include at least one processor and computer-readable instructions stored in non-transitory computer readable medium and executable by the at least one processor to perform the method steps discussed above.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

Figure 1:
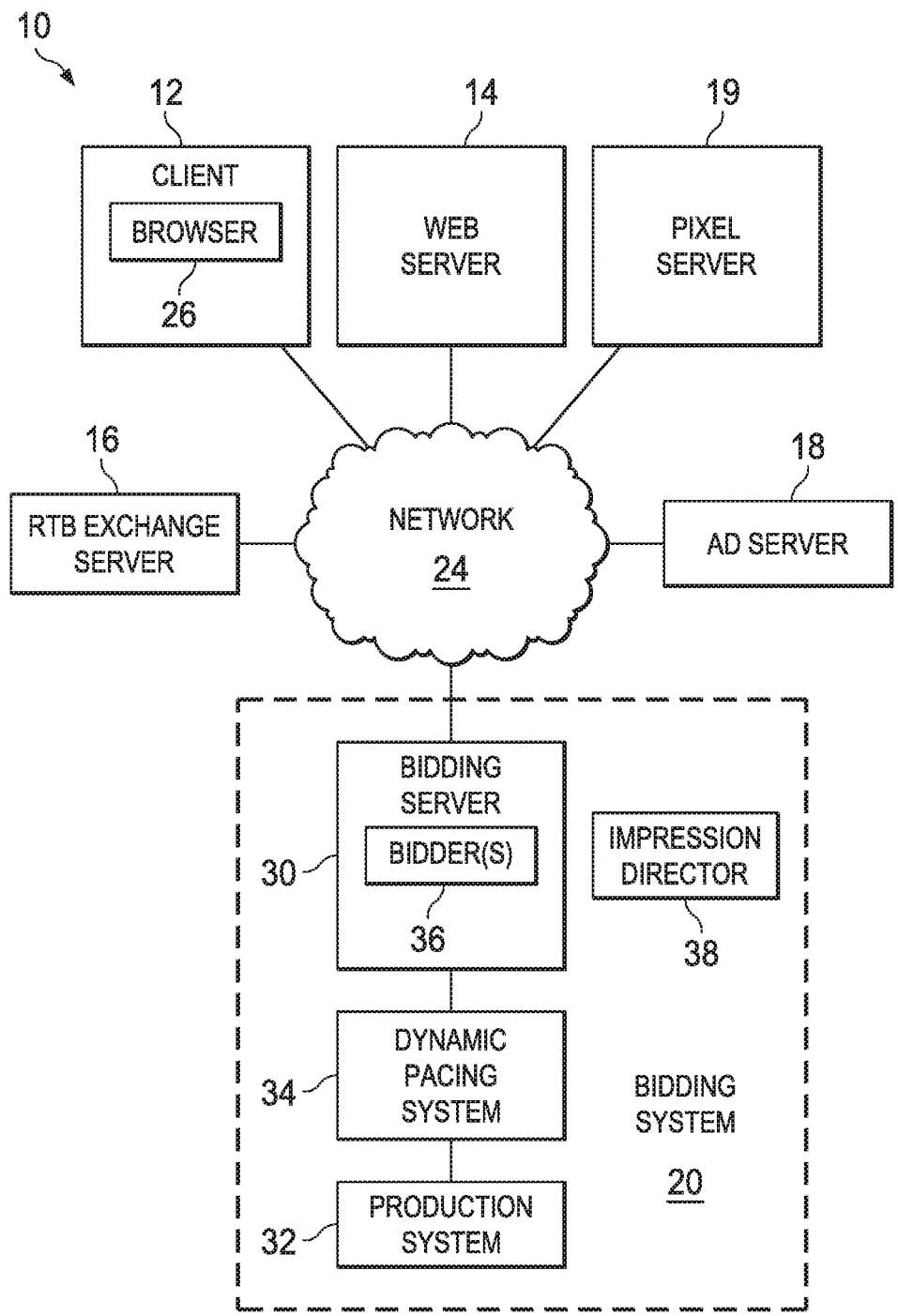
FIG. 1 illustrates an example system level architecture for an real-time bidding online advertising system, according to various embodiments.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Systems and methods for controlling purchasing/delivery of online advertisements in a real-time bidding system are disclosed. In particular, some embodiments provide for geographic-based control of impression purchasing/delivery, e.g., by dynamically controlling the pace of impression purchasing for each of multiple different geographic regions. In some embodiments, target geographic locations associated with a campaign are identified, and target geographic regions associated with each target geographic location are further identified. A pacing score is determined for each target geographic region. The bidding system may then make bidding decisions regarding RTB bid requests received from an RTB exchange based at least on whether the respective bid request is associated with a target geographic region, and if so, the pacing score for that target geographic region. A campaign-related impression is delivered for each winning bid, and impression delivery data is stored for each target geographic region. Over time, the bidding system may automatically adjust the pacing score for each target geographic region based on the stored impression delivery data for that geographic region, and may then use the adjusted pacing scores for bidding decisions on subsequently received RTB bid requests.

Each of the features and teachings disclosed herein can be utilized separately or in conjunction with other features and teachings to provide a system and method for combining past user events with real-time user events to rapidly respond to advertising opportunities. Representative examples utilizing many of these additional features and teachings, both separately and in combination are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of processes and symbolic representations of operations on data bits within a computer memory. These process descriptions and representations are the means used by those skilled in the data processing arts to most effectively convey the substance of their work to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. The steps are not intended to be performed in a specific sequential manner unless specifically designated as such.

However, all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

FIG. 1 illustrates an example system level architecture for a system 10 for controlled purchasing of online advertisements in a real-time bidding (RTB) environment, according to one embodiment. System 10 may include a plurality of clients 12, web servers 14, an RTB exchange system 16, one or more advertisement servers (ad servers) 18 hosting a variety of advertisement content, one or more pixel tag servers 19 (in some embodiments), and one or more bidding systems 20, all connected via a network 24. Each client 12 may host a browser 26 configured to view webpages hosted by web servers 14 via network 24. When a user at a client 12 clicks a link or otherwise opens a webpage, the web server 14 hosting the webpage sends data to RTB exchange system 16 indicating details of each ad placement on the requested page. RTB exchange system 16 then generates a real-time bid request for each ad placement on the requested page and sends each bid request to each bidding system 20 in the system 10. Thus, because each bid request relates to an ad placement for an instance of a page load, each bid request relates to an a particular ad impression.

In another embodiment, when a user at client 12 opens the webpage, the webserver 14 hosting the web page serves the webpage to client 12 and includes within that webpage one or more ad tags. Each ad tag is a uniform resource locator (URL) that instructs the web browser of client 12 to load content from RTB exchange server 16. The ad tag may include data indicating details of an ad placement on the requested page. RTB exchange system 16 then generates a real-time bid request for the ad placement on the requested page and sends the bid request to each bidding system 20 in the system 10. RTB exchange server 16 then responds to the ad tag request with web content containing a redirection command (e.g., a HTTP 302 response code) that includes a URL for the ad content selected by the winning bidder. Client 12 interprets the redirection command and requests ad content using the provided URL. This ad content may be, for example, text, an image, streaming content, or some mix of web content.

Each bidding system 20 is configured to analyze each incoming bid request and determine whether to bid on the respective placement/impression, and if so, a corresponding bid price.

RTB exchange system 16 may then determine a winning bid for each bid request, e.g., by comparing the respective prices of bid requests received from multiple different bidding systems 20, and inform the winning bidding system 20 identified in the winning bid. The winning bidding system 20 may then select an appropriate advertisement to be served to the client 12, and impression director 18 may direct the respective ad server 18 hosting the selected advertisement to serve the selected advertisement, such that the advertisement is served in the respective placement (which was identified in the bid request) of the webpage being loaded by the client's web browser 26.

Each bidding system 20 may include any suitable components and utilize any suitable models or algorithms to make bidding determinations for incoming bid requests from RTB exchange server 16. In some embodiments, bidding system 20 may be configured to generate a target delivery plan for purchasing/serving ad impressions for a particular ad campaign, and a pacing system for managing the rate of purchasing impressions over time.

In the example embodiment shown in FIG. 1, a bidding system 20 includes a bidding server 30, a production system 32, a dynamic pacing system 34, and an impression director 38, each of which includes any suitable hardware, software, and/or firmware for performing the respective functions of the bidding system 20. Bidding system 20 may include any number of instances of each component, e.g., multiple bidding servers 30. Further, the various components of bidding system 20 may be located at a common physical location, or may be geographically distributed and communicatively connected by network 24 or other network(s).

Bidding server 30 may include one more bidders 36 that include processing resources and computer code (e.g., software) stored in memory and executable to score incoming bid requests and make real-time bidding determinations based on rules and data supplied by production system 32 and dynamic pacing system 34, and generate and send bid responses to RTB exchange system 16 indicating a decision to bid or pass on each bid request (or alternatively may respond only to bid requests it wishes to bid on) and a corresponding bid price.

Production system 32 may be configured to generate and provide a list of rules to the bidding server 30, which uses the rules to score each incoming bid request. Production system 32 may also be configured to generate and provide a delivery plan to dynamic pacing system 34, which may dynamically calculate a campaign-level pacing threshold value and/or geographic region pacing scores based on the delivery plan. Dynamic pacing system 34 may provide the dynamically calculated pacing threshold value and geographic region pacing scores to bidding server 30, which may calculate a bid request score for each incoming bid request based at least on a relevant geographic region pacing score, and compare the bid request score to the campaign-level pacing threshold value to determine whether to bid on the bid request.

Production system 32 may store or have access to parameters for an ad campaign (or multiple simultaneously-running ad campaigns), such as a campaign setup, target metrics (goals), and requirements, and may be configured to generate a delivery plan for purchasing and serving ad impressions for a defined lifetime of the campaign, or some other duration. The delivery plan may define different impression purchase quotas or targets for a given period of time, e.g., a month, a week, a day, an hour, a minute, or any combination of such time periods. In some embodiments, the delivery plan may specify a target delivery profile (i.e., target delivery profile) that defines a target rate of impressions purchased (target purchase rate) over time for a defined time period, which rate may be static or dynamic over the defined time period. For example, the target delivery profile may define a time-based curve of a dynamic target purchase rate over time, which curve may be generated based on known time-based dynamic information, such as a dynamic internet activity curve, a dynamic traffic curve for a particular website, a dynamic online traffic curve for users in a particular geographic region, or any other suitable data.

Impression director 38 comprises a server configured to direct ad servers 18, which may be owned by third parties distinct from bidding system 20, to serve advertisements upon notification of winning bids by RTB exchange 16. In some embodiments, each bid submitted by bidding server 30 includes a pointer (URL) to the impression director server 38. When a bid submitted by bidding system 20 wins the respective action at RTB exchange 16, the exchange 16 notifies the impression director 38 via the pointer (URL), and the impression director 38 then identifies and directs the appropriate ad server 18 to serve the appropriate ad. Impression director 18 may collect and store data regarding the ads (impressions) served over time, which data may be supplied as feedback to bidding system 20 for influencing subsequent decisions of bidding system 20. For example, in some embodiments, impression director 18 may count the number ads (impressions) served over time, which may be used as feedback for influencing the pacing of impression purchasing.

System 10 typically benefits a web publisher (i.e., a person or business providing content on web server 14) by allowing a vast number of advertisers to bid for the right to display ads along the publisher's content. The competition among advertisers may offer web publishers greater ad revenue and/or lower costs to obtain ad revenue compared to a scenario where a web publisher has to contract with individual advertisers. System 10 also benefits advertisers by allowing access to a vast number of web publishers.

Technical Challenges Presented by "Real-Time" Bidding Protocols

RTB Exchanges 16 typically implement a protocol that requires that the bidding process for each ad placement of a loading webpage be completed within a time period of a small fraction of a second, e.g., within 80, 100, or 120 milliseconds, i.e., a period of time that is generally less than the 100-400 milliseconds it takes to blink one's eyes. One goal of a "real-time" bidding process is to keep bid response times (and thus web page load times) fast enough to keep the user's attention. Research into user behavior has shown that users expect web pages to load quickly and will abandon a website if load times are too long. For example, one 2009 study concluded that consumers expect a load time of no more than two seconds, which is twice as fast as the expected load time reported by a similar study conducted in 2006.

The real-time bidding process, which typically must be completed within a small fraction of a second as discussed above, is an extremely complex process involving numerous network-based communications between different entities and execution of numerous, often very complex, processing and decision-making algorithms. For example, real-time bidding process typically involves, upon selection (e.g., by a user) of a webpage for loading, generation of a bid request for each ad placement included in the webpage, sending the bid request for each placement from a real-time bidding exchange to a plurality of bidding systems, each bidding system analyzing each bid request and executing various bidding algorithms to determine whether to bid on each bid request, as well as determining a bid price for each bid, and sending the bids back to the exchange, and the exchange receiving the bids from the bidding systems, selecting a winning bid for each ad placement, and sending out notifications of the winning bids. This entire process is completed within the fraction of a second as defined by the relevant RTB protocol, and repeated for every page load of any webpage having ad placements specified for real-time bidding.

Thus, with reference to the system shown in FIG. 1, bidding system 20 must respond to each bid request received from an RTB exchange server 16 in a fraction of the time the RTB exchange server 16 is allotted for responding to an ad request. This processing time allotted to bidding system 20 may be 10 milliseconds, 20 milliseconds, or up to 100 milliseconds in some cases. In some systems, the RTB exchange server 16 may select a winning bid as soon as it has received a threshold number of bids, rather than holding the auction open for a preset time. In such systems, a bidding system 20 with a bid response time of 20 milliseconds may have a measurable competitive advantage over another bidding system 20 that could only respond to a bid in 40 milliseconds.

Thus, based on the above, the real-time bidding process presents enormous technical challenges that are unique to the real-time bidding environment, e.g., as compared with conventional advertising techniques and even previous online advertisement protocols. For example, prior to the advent of real-time bidding for online advertisements, an advertiser would typically purchase blocks of ad impressions (e.g., in increments of 1,000) from selected web sites, which web sites would then serve the purchased ads over a specified period of time. This previous process did not involve anywhere near the level of technical complexity or extremely fast "real-time" processing required by the real-time bidding systems discussed herein. Thus, the real-time bidding process for online advertisements introduces unique technical challenges that did not previously exist. In addition, as RTB bidding systems become more complex, e.g., by attempting to target particular customers or websites having particular content, the required algorithms and processing resources become even more challenging and complex.

As used herein, the term "real-time" in the context of "real-time bidding" refers to a bidding processing for ad placements in a webpage that occurs during the loading of the webpage, and in some bidding systems is further defined by a specified time period for completion of the bidding process (e.g., 100 ms) during the loading of the page. In other contexts (e.g., with respect to the determination and/or adjustment of a pacing threshold value for controlling the rate of purchasing impressions), the term "real-time" means (a) according to a defined time schedule of operations (e.g., as specified by a relevant external or internal protocol) and/or (b) in an ongoing manner during the ongoing execution of a related process (e.g., a related process that uses that output of the relevant "real-time" process as input) or during the ongoing execution of the respective ad campaign, as would be understood by one of ordinary skill in the art in view of the relevant context of each respective use of the term.

Figure 2A:
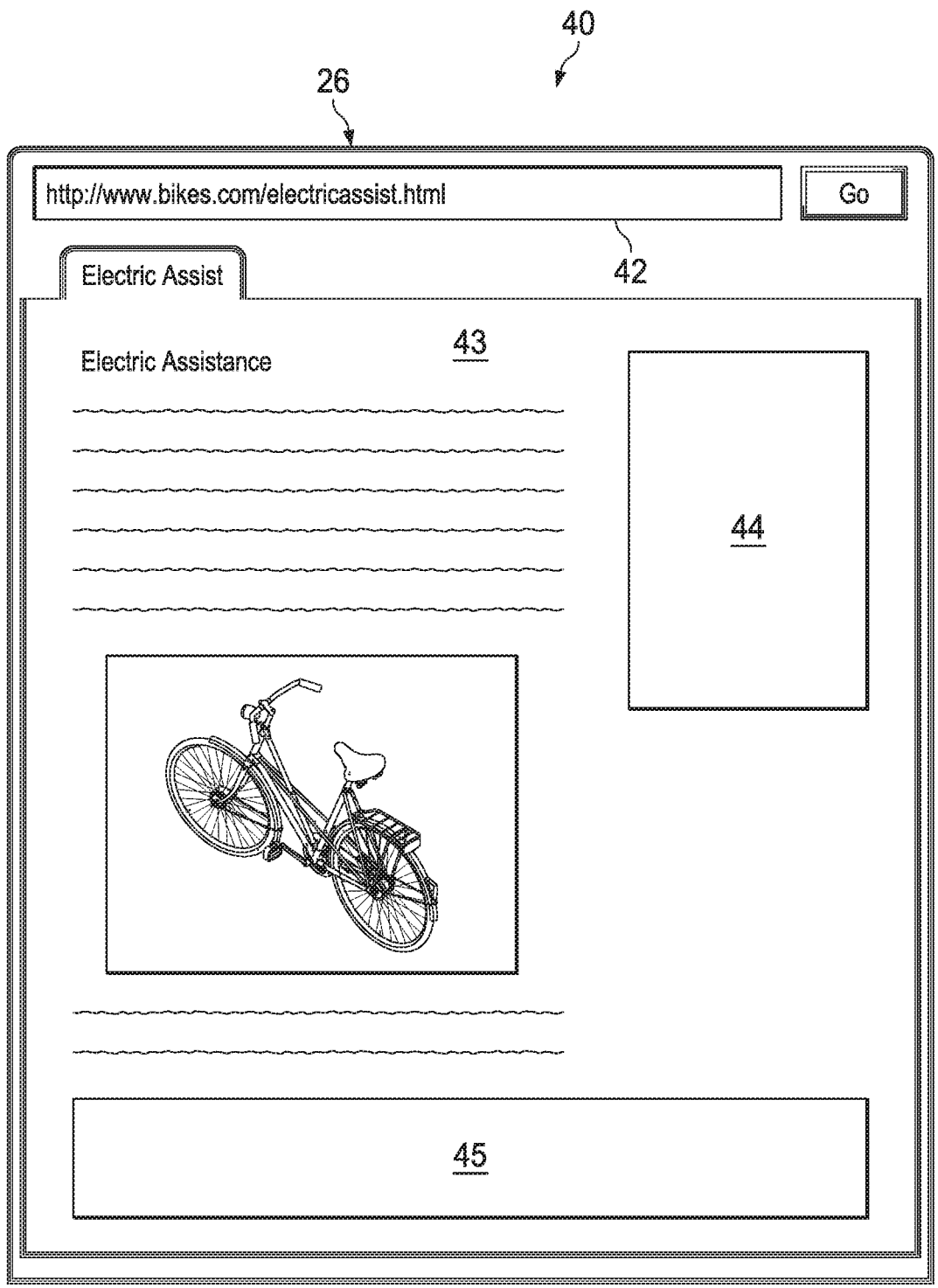
FIG. 2A illustrates an example snapshot of a web browser display, according to one embodiment.

FIG. 2A illustrates an example snapshot 40 of web browser 26 showing the display at client 12 of system 10, according to one embodiment. Snapshot 40 comprises URL address bar 42 and web content 43. Snapshot 40 illustrates a partially rendered web page showing content retrieved by client 12 from web servers 14 via network 24 but shows unpopulated ad placement locations 44 and 45. In some embodiments, ad placements may be rendered before or at least partially simultaneously with the remaining content in the web page; however, this illustration shows the primary web content rendered first to illustrate the ad placement locations. Web content 43 as shown in snapshot 40 is an article about electric assistance systems to aid bicycle riders on long rides or up hills.

Figure 2B:
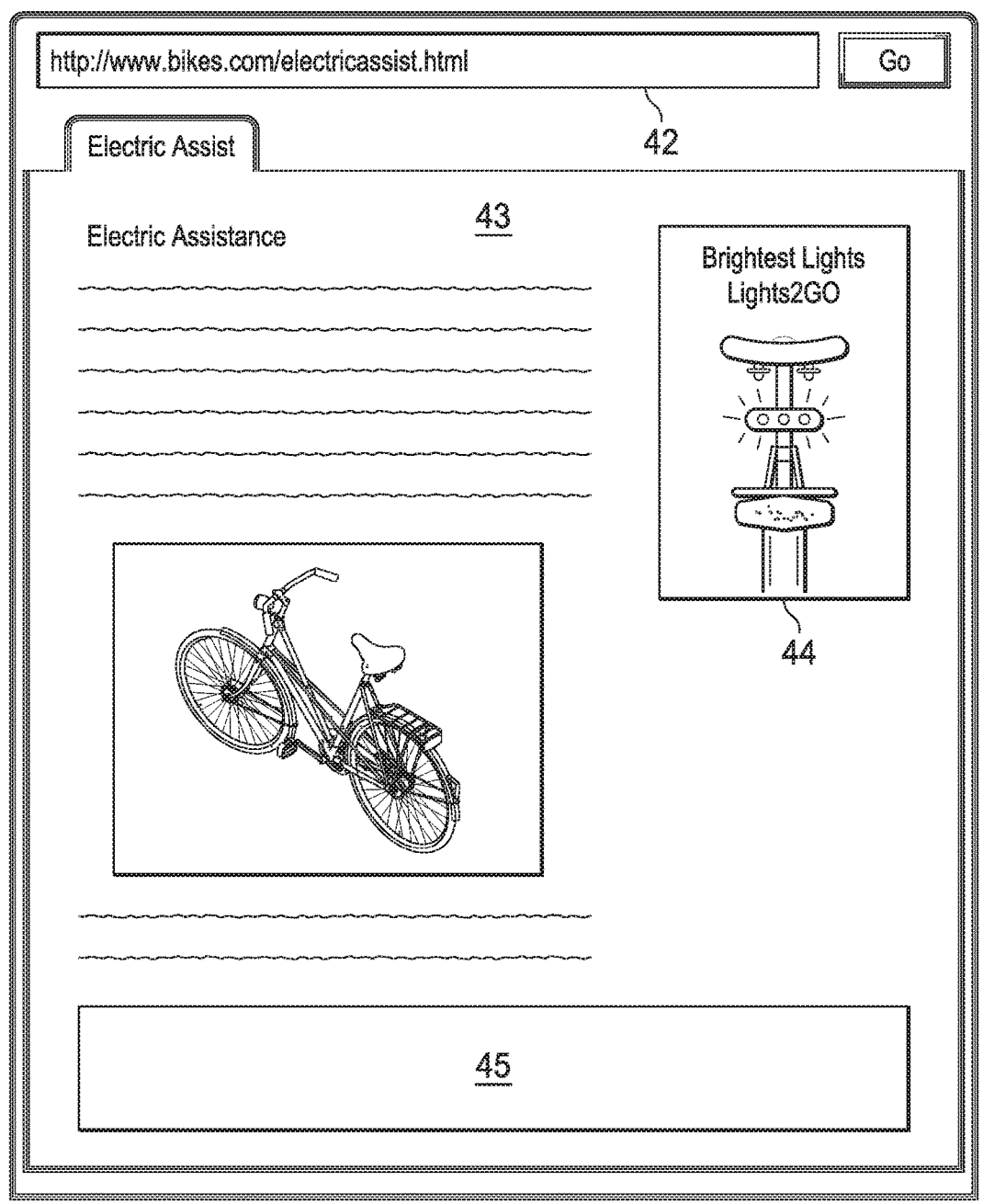
FIG. 2B illustrates another example snapshot of a web browser display, according to one embodiment.

FIG. 2B illustrates an example snapshot 41 of web browser 26 showing the display at client 12 of system 10, according to one embodiment. Snapshot 41 comprises URL address bar 42 and web content 43. Snapshot 40 illustrates a partially rendered web page showing content retrieved by client 12 from web servers 14 via network 24, populated ad placement location 44, and unpopulated ad placement location 45. Ad placement location 44 is shown populated with ad content received from, for example, a particular ad server 18 corresponding to the winning bid selected by RTB exchange system 16. In snapshot 41, ad placement location 44 is populated with an advertisement for bicycle lights, while web browser 26 may be loading an advertisement for a political campaign to be rendered in ad placement 45.

Figure 3:
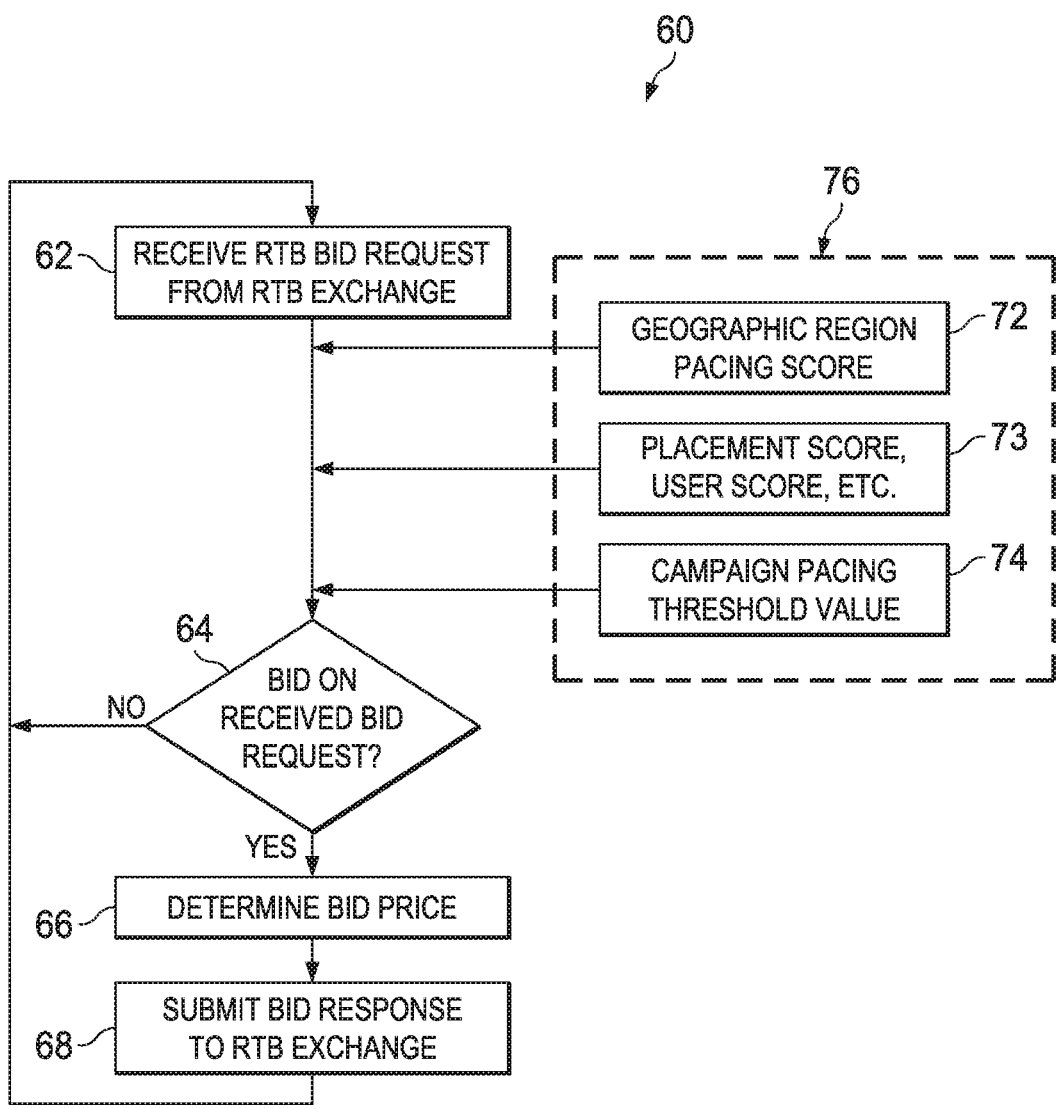
FIG. 3 illustrates a flowchart for an example method of executing an online advertisement campaign in a real-time bidding (RTB) system, according to one embodiment.

FIG. 3 illustrates a flowchart for an example method 60 of executing an online advertisement campaign in an RTB system, according to one embodiment. At step 62, a bidder 36 of bidding system 20 receives a real-time bid request from RTB exchange system 16 for an ad placement in a webpage or other digital content being loaded or rendered via a client browser 26. The bid request information in the incoming bid request may identify the URL of the webpage being loaded, details regarding the ad placement, information regarding the end-user device loading or rendering the webpage or other digital content (e.g., IP address and/or other identifying information), a cookie, and/or any other types of information.

At step 64, bidder 36, which may be running one or more online ad campaigns, may determine in real-time whether or not to submit a bid on the ad placement for a particular campaign based on (a) information in the bid request and (b) one or more parameters 76 associated with (i) the end user determined by bidding system 20 to be associated with the bid request and/or (ii) the campaign, which parameters 76 may be known to and/or managed by bidding system 20. In some embodiments, parameter(s) 76 may include a geographic region pacing metric 72, additional metric(s) 73 related to the bid request, a campaign-level pacing threshold value 74, and/or any other suitable input data.

As discussed in detail below, the geographic region pacing metric 72 may indicate a level of bidding aggressiveness for a particular geographic region associated with the bid request, e.g., a geographic region corresponding with the particular end user device associated with the bid request. System 34 may set and/or adjust a geographic region pacing metric 72 for each of multiple geographic region targeted for the particular campaign. Each geographic region pacing metric 72 may be set and/or dynamically adjusted by pacing system 34 to control the rate of impressions delivered to the respective geographic region (e.g., to end user devices associated with that geographic region), for example based on a target impression delivery rate or target impression delivery volume for the respective geographic region, e.g., as defined for the particular campaign. In some embodiments, system 34 may control each geographic region pacing metric 72 with the goal of delivering a target number of impressions specified for that that geographic region. System 34 may dynamically control each geographic region pacing metric 72 using any control algorithm or techniques, e.g., using a PID (or PI) controller, as discussed below.

The additional metric(s) 73 may include one or more other metrics or data related to the bid request, e.g., as determined based in information contained in the bid request. For example, as indicated in FIG. 3, additional metric(s) 73 may include a "placement score" indicating a level of attractiveness of the ad placement identified in the bid request with respect to the particular campaign, a "user score" indicating a level of attractiveness of the end user/end user device identified in the bid request with respect to the particular campaign (e.g., wherein the end user device may be identified and used as a proxy for the actual end user). Such user score may be based on geographic location data, demographic data, interest data, and/or any other data associated with the end user/end user device, e.g., according to data stored or accessible by bidding system 20.

The campaign-level pacing threshold value 74 may be a dynamically adjusted metric (by dynamic pacing system 34) for controlling the rate of overall (e.g., across all target geographic regions) impression delivery for the particular campaign. In some embodiments, campaign-level pacing threshold value 74 may be set and/or controlled according to a target delivery profile for the campaign, e.g., as disclosed in co-pending U.S. application Ser. No. 14/610,448, filed Jan. 30, 2015, the entire contents of which application are herein incorporated by reference. For example, a target delivery profile may specify a target number of impressions to delivery during each successive time period (e.g., every minute or every hour), and system 34 may control the pacing threshold value 74 with the goal of delivering the target number of impressions specified for the current time period. System 34 may dynamically control the campaign-level pacing threshold value 74 using any control algorithm or techniques, e.g., using a PID (or PI) controller, as discussed below.

Bidder 36 may apply any suitable rules or algorithms at step 64 for determining whether to submit a bid based on the geographic region pacing score 72, additional metric(s) 73, the campaign-level pacing threshold value 74, and/or any other suitable input data. For example, in some embodiments bidder 36 may calculate an overall bid score for the RTB bid request based on the geographic region pacing metric 72 and additional metric(s) 73, and compare the overall bid score to the campaign-level pacing threshold value 74, and determine to submit a bid only if the overall bid score meets or exceeds the campaign-level pacing threshold value 74.

If bidding system 20 determines to bid on a particular bid request, bidder 36 may determine a bid price for the bid based on any relevant data and using any suitable algorithm(s) at step 66, and submit a bid response (indicating the bidder and the bid price) to the respective RTB exchange 16, all within the predefined time limit (e.g., 100 ms) from the time the R TB exchange 16 sent out the bid request to the time the RTB request receives the bid response from bidder 36. For example, bidder 36 may determine a bid price for each respective bid based at least on some or all of data 76 and/or other suitable data. As another example, bidder 36 may determine the bid price based further on one or more pricing curves corresponding to the bid request, e.g., a win probability-sale price curve and/or a bid-price curve corresponding to the placement identified in the bid request and/or other parameters associated with the bid request, e.g., as disclosed in co-pending application U.S. Ser. No. 14/711, 130, filed on May 13, 2015, the contents of which are hereby incorporated by reference.

The method then returns to step 62 for the next incoming bid request. Bidding system 20 may include multiple bidders 36 to simultaneously process multiple incoming bid requests.

It is contemplated that the above-mentioned example components may be combined or divided into sub-components, and that the components may be implemented using software elements, hardware elements, or a combination of software and hardware elements to perform the various logical functions described herein. Such variations are within the scope of the present subject matter.

Pacing Control of Impression Delivery for Individual Geographic Regions

By dynamically controlling pacing of a digital advertising campaign, a client may be better able to optimize the efficacy of that campaign by optimizing the campaign's targeting during the campaign. Further, by dynamically controlling pacing of a digital advertising campaign, a client may be better able to optimize inventory levels and staffing across a plurality of client locations by optimizing the campaign's targeting during the campaign. Still further, by providing systems and methods for dynamically controlling pacing of a digital advertising campaign, clients may improve rea-time bidding decisions for online impressions.

In some embodiments, dynamic pacing system 34 may simultaneously control the impression purchasing/delivery pace for multiple different geographic locations or geographic regions targeted for a particular campaign. Geographic locations or geographic regions may be defined by any geographic parameters or identifier, e.g., states, cities, area codes, zip codes, neighborhoods, latitude/longitude locations and/or ranges, other government-defined geographic shapes, custom shapes (e.g., custom combinations of government-defined geographic shapes), etc.

For example, a client of bidding system 20 may have multiple stores within a large geographic area (e.g., a state or country), wherein each store is located at a geographic location, and wherein a number of geographic regions (e.g., zip codes) are geographically associated with the geographic location of each store (e.g., within a geographic area defined by a circle of a defined diameter extending around each store). Dynamic pacing system 34 may target all of a subset of such geographic regions (e.g., zip codes) for a campaign for the client, and simultaneously control the pace of impression purchasing/delivery to each targeted geographic region, e.g., to ensure that all targeted geographic regions are served according to target parameters.

In some embodiments, dynamic pacing system 34 may control the impression delivery pacing for each target geographic region using a dynamically controlled pacing metric, referred to herein as a "pacing score," that is used as input by bidder(s) 36 for making bidding decisions regarding RTb bid requests associated with respective target geographic region. The pacing score for each geographic regions may indicate the current pace at which dynamic pacing system 34 wishes to deliver impressions to that geographic regions. For example, dynamic pacing system 34 may set a low pacing score for a particular geographic region to deliver impressions to that geographic region at a slow pace (e.g., if the particular geographic region has been overserved with respect to a predefined impression volume budgeted for that geographic region), or set a high pacing score to deliver impressions to the geographic region at a fast pace (e.g., if the particular geographic region has been underserved with respect to a budgeted impression volume).

In some embodiments, a bidder may calculate an overall bid score based on the dynamically controlled pacing score of the geographic region associated with the respective bid request and one or more other bid decision inputs (e.g., a placement score, user score, time of day, etc.), and the overall bid score may then be compared to the current value of a pacing threshold (e.g., the PID-adjusted pacing threshold discussed herein) to determine whether to submit a bid for the respective placement.

These techniques may allow bidding system 20 to provide improved geographic distribution of impressions, at a more granular (e.g., local) geographic level. For example, while a client may wish to target a particular high-level geography (e.g., a state), the client may be more interested in targeting particular portions of that geography (e.g., a particular city; individual neighborhoods within that city, etc.). In deciding the pacing for a digital campaign, including the total number of impressions to be delivered over the course of a campaign, a client may wish to budget for certain percentages of the total number of impressions to be delivered to each of a number of local audiences, e.g., located in geographical regions near physical stores. Dynamic pacing system 34 may assign each local geographic region an associated pacing score based on the percentage or number of impressions assigned to that region. The pacing score may then be used by bidder(s) for making bidding decisions, and automatically adjusted over time by pacing system 34 to correct for over- or under-serving of impressions to that geographic region with respect to the percentage or number of impressions assigned to that region.

In some embodiments, a campaign may also be monitored during the course of the campaign to determine the performance or efficacy of the campaign within various geographic regions, e.g., based on in-store sales data. If changes are desired (e.g., where a particular product or service is selling better in one neighborhood than another), then the pacing scores associated with the relevant geographic region(s) may be adjusted accordingly by dynamic pacing system 34.

Target impression volumes and/or pacing scores may be assigned to geographic locations and/or geographic regions via geographic identifiers associated with the respective geographic locations and/or geographic regions. For example, a respective pacing score may be assigned to unique identifiers associated with each of a plurality of geographic regions.

In some embodiments, systems and methods for dynamically controlling pacing of a digital advertising campaign at a granular (e.g., neighborhood-level) geographic level may be further used for optimizing inventory and/or staffing levels at individual stores associated with the campaign. For example, a client may wish to steer more customers toward individual stores with higher current inventory levels. By dynamically controlling the pacing impression purchasing/delivery to users in target geographic regions associated with the higher-inventory stores, a client may be better able to optimize current inventory. Similarly, a client may wish to steer customers away from an individual store with a known staffing problem (and/or toward individual stores with better staffing metrics).

In some embodiments, the dynamic control of pacing scores for different geographic regions may be incorporated in an automated closed loop control of an advertising campaign, which may provide operational feedback to the decision-makers responsible for the campaign. For example, system 34 may implement rules or algorithms to automatically adjust one or more relevant pacing scores associated with one or more local audience geographical identifier(s) in order to optimize an advertising campaign.

In some embodiments, dynamic pacing system 34 may control geographic-level pacing scores based on user traffic data. For example, dynamic pacing system 34 may receive traffic data collected by one or more sensors, e.g., located in or near stores, that may detect and monitor movements of user devices, e.g., any of the sensors or sensors systems disclose in pending application U.S. Ser. No. 14/974,791, filed Dec. 18, 2015, the entire contents of which application are herein incorporated by reference. Dynamic pacing system 34 may use such traffic sensor data as an input for setting or adjusting geographic-level pacing scores for particular geographic regions. For example, if a sensor system at a particular store indicates a high level of traffic, or a high level of traffic passing by a particular product, or a high level of traffic from users having particular demographic characteristics, system 34 may adjust (e.g., increase) the pacing score for geographic regions associated with that store.

Further, dynamic pacing system 34 may control geographic-level pacing scores based on traffic lift associated with particular geographic regions. For example, if a particular campaign has a relatively high traffic lift metric (e.g., a metric associated with a sales increase related to a particular advertising campaign) associated with a particular demographic, pacing control system 34 may adjust (e.g., increase) the pacing score for geographic regions associated with that particular demographic (e.g., based on aggregate user demographics of users within each geographic region).

Figures 4, 7:
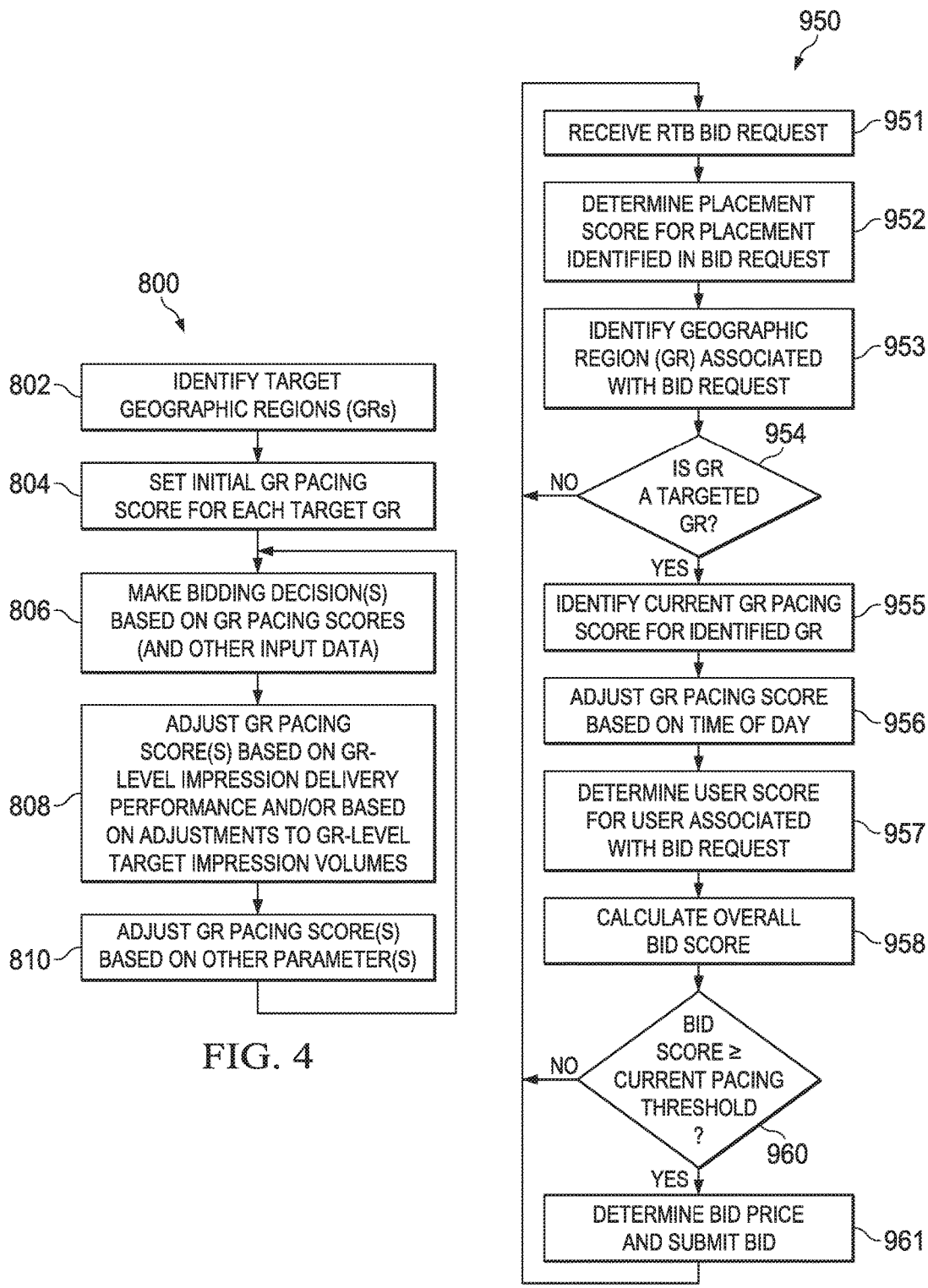
FIG. 4 illustrates an example algorithm for dynamically controlling the pace of impression purchasing among multiple geographic regions for a particular campaign, according to some embodiments.
FIG. 7 illustrates an example bidding decision algorithm for making bidding decisions based at least on dynamically adjusted pacing scores associated with respective geographic regions, according to one embodiment.

FIG. 4 illustrates an example algorithm 800 for dynamically controlling the pace of impression purchasing among multiple geographic regions for a particular campaign. In some embodiments, algorithm 800 may be embodied in software or other executable code stored in memory and executable by processor(s) of dynamic pacing system 34 of bidding system 20.

At 802, dynamic pacing system 34 may identify a plurality of target geographic regions for a particular online ad campaign. System 34 may identify or select the target geographic regions based on any suitable rules, or may receive a list of target geographic regions for the particular campaign, e.g., from a third party. In some embodiments, system 34 may select or receive a list of geographic locations (e.g., corresponding to a group of stores related to the campaign), identify a set of one or more geographic regions proximate to or otherwise associated with each geographic location (e.g., each store location), and filter the set of geographic regions associated with each geographic location (e.g., store) to identify one or more target geographic regions associated with each geographic location (e.g., store). This process for identifying target geographic regions for a campaign is discussed in detail below with reference to the example algorithms 850 and 900 shown in FIGS. 5 and 6.

At 804, dynamic pacing system 34 may set an initial pacing score for each target geographic region for the campaign. As discussed below, the pacing score for each target geographic region is used at input by bidder(s) 36 for making real-time bidding decisions on bid decisions associated with each respective target geographic region. The higher the pacing score for a particular geographic region, the more likely a bidder 36 will submit bids on bid request associated with that geographic region, and vice versa. (It should be understood that the pacing score could similarly be designed with the opposite effect—i.e., the higher the pacing score, the less likely a bidder 36 will submit a bid). Thus, the pacing score for each target geographic region indicates a measure of aggressiveness for purchasing/delivering impressions to that target geographic region.

In some embodiments, system 34 may determine an initial pacing score for each target geographic region based on a target impression volume for the respected target geographic region. In this context, a target impression volume may refer to a volume of impressions (related to a particular campaign) to be delivered for a respective geographic location, or to a geographic region, according to defined goals or targets of the particular campaign. The volume of impressions may be expressed in any suitable manner, e.g., as a number (e.g., the target impression volume for a particular geographic region is 100,000 impressions) or as percentage (e.g., the target impression volume for a particular geographic region is 15% of the total target impression volume for the particular campaign).

In some embodiments, a total campaign-level target impression volume is defined for a campaign (e.g., by a client or by dynamic pacing system 34), the total campaign-level target impression volume is distributed among each target geographic region identified for the campaign (e.g., by a client or by dynamic pacing system 34) to define a geographic region-level target impression volume for each target geographic region, and system 34 calculates an initial pacing score for each target geographic region based on the target impression volume for that target geographic region. The initial pacing score for each geographic region may be intended to result in the target impression volume being delivered to that geographic region, e.g., by the end of the campaign. Example steps for determining an initial pacing score for each target geographic region for a campaign are discussed in detail below with reference to example algorithms 850 and 900 shown in FIGS. 5 and 5.

At 806, bidding system 20 may use the initial pacing scores for the respective target geographic regions as input for making bidding decisions for the campaign. During the campaign, ne or more bidders 36 of bidding system 20 receive a stream of RTB bid requests. For each received bid request, the respective bidder 36 determines based on identifying information in the bid request whether the bid request is associated with a target geographic region for the campaign. If not, the bid request is not considered for that campaign. If so, the bidder 36 may evaluate the current pacing score for the target geographic region associated with the bid request, along with various other input data (e.g., a placement score regarding the placement identified in the bid request and/or a user score associated with an end user identified based on identifying information in the bid request) to determine whether to submit a bid. Example algorithms for making bidding decisions based on pacing scores assigned to geographic regions (along with other input data) are discussed in detail below with reference to example algorithms 850, 90, and 950 shown in FIGS. 5-7.

At 808, dynamic pacing system 34 may automatically adjust the initial pacing score for each geographic region over time (e.g., during the execution of the campaign), e.g., based on the impression delivery performance to date for each respective geographic region, and/or based on adjustments to the target impression volume assigned to the respective geographic regions (e.g., due to adjustments in store-level target impression volumes). Dynamic pacing system 34 may adjust the pacing score for each geographic region using any rules or algorithms, e.g., by implementing an automated open-loop or closed-loop control system. For example, as discussed below, in some embodiments system 34 may adjust geographic region pacing scores using a PID or PI controller.

The adjusted pacing score for each target geographic region may be communicated to each bidder 36 executing the campaign, such that the bidder(s) 36 may implement the adjusted pacing scores for bidding decisions on incoming bid requests.

At 810, dynamic pacing system 34 may adjust one or more pacing score based on any other parameters or information collected or received at bidding system 20, e.g., traffic data, traffic lift data, product inventory data, sales data, user online activity data, and/or any other type(s) of data that may be relevant to adjusting the target impression volume or desired impression delivery pace for one or more target geographic region for the campaign. Dynamic pacing system 34 may perform such pacing score adjustments using any suitable control system or algorithm. Any such pacing score adjustments may then be communicated to the relevant bidder(s) 36 for implementation.

Figure 5:
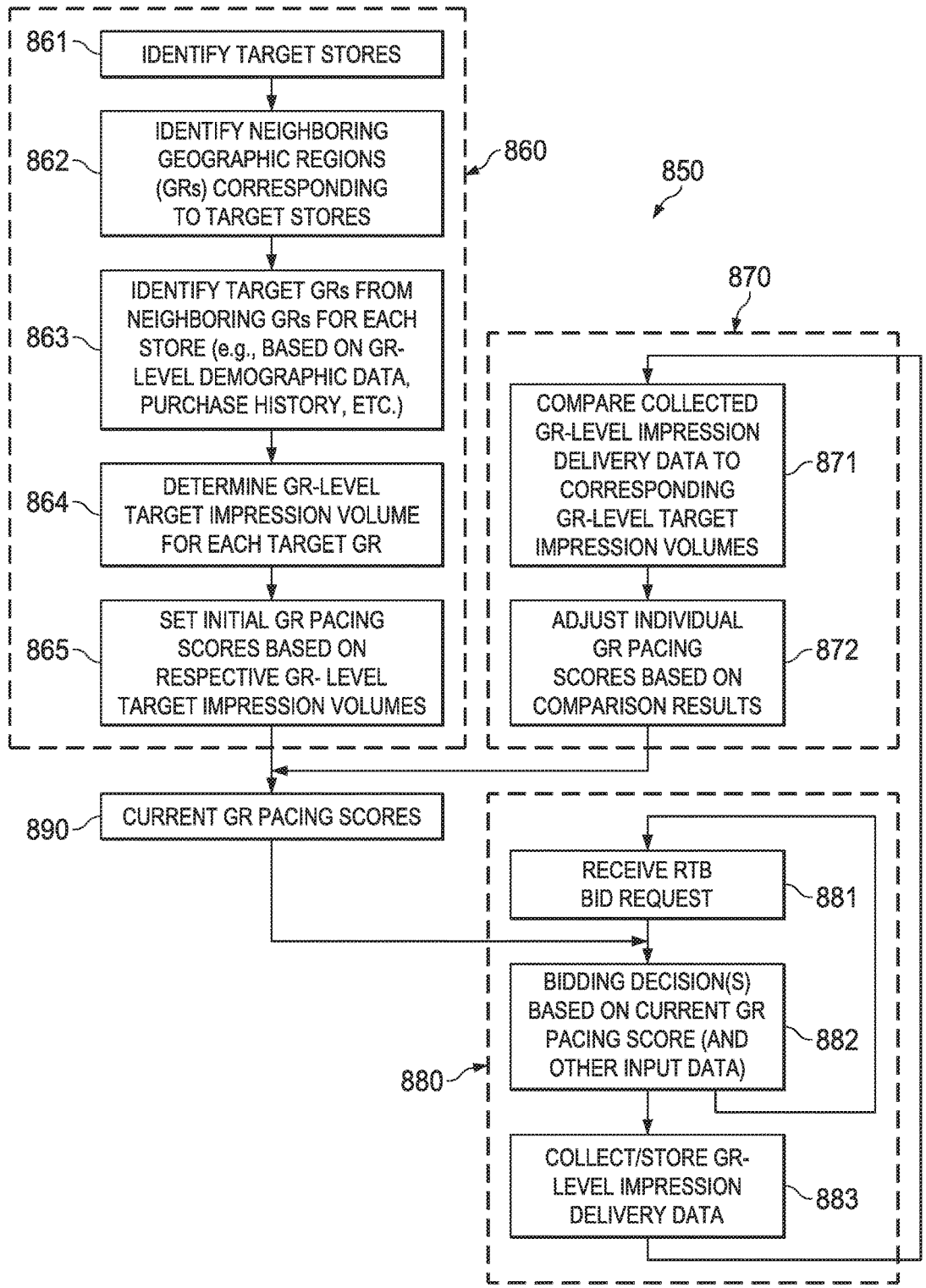
FIG. 5 illustrates an example algorithm for setting and dynamically adjusting geographic region-specific pacing scores for controlling the pace of impression delivery to a plurality of target geographic regions for a particular campaign, according to one embodiment.

FIG. 5 illustrates an example algorithm 850 for setting and dynamically adjusting geographic region-specific pacing scores for controlling the pace of impression delivery to a plurality of target geographic regions for a particular campaign. In some embodiments, algorithm 850 may be embodied in software or other executable code stored in memory and executable by processors of dynamic pacing system 34 and bidder(s) 36 of bidding system 20.

Algorithm 850 may include multiple modules, including an initial pacing score module 860, a pacing score adjustment module 870, a real-time bidding module 880, and a current pacing score storage module 890. Module 860, 870, and 880 are related but may be executed semi-independently of each other by dynamic pacing system 34 and bidder(s) 36. Pacing score adjustment module 870 (executed by dynamic pacing system 34) and real-time bidding module 880 (executed by bidder(s) 36) may be executed in parallel and at any suitable frequencies.

Initial pacing score module 860, which may be executed by dynamic pacing system 34, is configured to define an initial pacing score for each target geographic region for the particular campaign. At 861, system 34 may identify a plurality of target stores for a particular online ad campaign, each target store having a corresponding geographic location. For example, the campaign may be intended to increase customer traffic at each of the target stores. System 34 may identify or select the target stores based on any suitable rules, or may receive a list of target stores for the particular campaign, e.g., from a third party.

At 862, system 34 may identify a set of one or more neighboring geographic regions associated with each target store. System 34 may apply any suitable rules or algorithm to identify the neighboring geographic regions associated with each target store. For example, for each target store, system 34 may define a circle or other geometric shape around the location of the target store and identify all geographic regions that are fully, partially, or at least 50% or other defined percentage (depending on the particular rules selection rules) within the circle/geometric shape. In one embodiment, system 34 may apply a dynamic store radius to each store to identify neighboring geographic regions, e.g., as disclosed in co-pending U.S. application Ser. No. 15/019,074, filed Feb. 9, 2016, the entire contents of which application are hereby incorporated.

At 863, system 34 may filter or analyze the set of neighboring geographic regions identified for each target store to identify one or more target geographic regions for that target store. For example, system 34 may score each neighboring geographic region with respect to the particular campaign, and identify as target geographic regions each geographic region having a score exceeding a defined threshold. In one embodiment, system 34 may score each neighboring geographic region based on stored characteristic data associated with the users of the respective geographic region, such as aggregated demographic user data, aggregated purchase history data, or any other data associated with the users of each geographic region.

At 864, dynamic pacing system 34 may determine a target impression volume for each target geographic region identified at 863. In one embodiment, system 34 may determine or receive input defining a campaign-level target impression volume for the campaign, a distribution of campaign-level target impression volume into a store-level target impression volume for each store covered by the campaign, and then a distribution of each store-level target impression volume into a geographic region-level target impression volume for each target geographic region associated with the respective store. Such target impression volumes may be distributed or otherwise determined in any suitable manner, by system 34 or by a client and received as input by system 34.

In some embodiments, the campaign-level target impression volume may be distributed equally among all stores, such that the store-level target impression volume is the same for each store. In other embodiments, the campaign-level target impression volume may be distributed in a weighted manner, such that different fractions of the campaign-level target impression volume are assigned to different stores, based on any suitable metrics, e.g., relative populations proximate each store, store size, relative inventory or sales data among the stores, etc.

Similarly, each store-level target impression volume may be distributed equally among all target geographic regions associated with that store, such that the geographic region-level target impression volume is the same for all target geographic regions associate with each respective store. In other embodiments, the store-level target impression volume may be distributed in a weighted manner, such that different fractions of each store-level target impression volume are assigned to different target geographic regions associated with that store, based on any suitable metrics, e.g., relative populations in the target geographic regions, aggregated demographic user data, aggregated purchase history data, or any other data associated with the users of each target geographic region. In one embodiment, a store-level target impression volume may be distributed among the associated target geographic regions based on the score determined at step 863 for identifying the target geographic regions.

At 865, dynamic pacing system 34 may set an initial pacing score for each target geographic region for the campaign based on the target impression volume determined for that target geographic region at 864. As discussed below with respect to real-time bidding module 880, the pacing score for each target geographic region is used at input by bidder(s) 36 for making real-time bidding decisions on bid decisions associated with each respective target geographic region. The pacing score for each target geographic region indicates a measure of aggressiveness for purchasing/delivering impressions to that target geographic region.

The initial pacing score determined for each target geographic region may be stored in memory accessible to bidder(s) 36, at 890. These initial geographic region-level pacing scores may be used by bidder(s) 36 for making real-time bidding decisions on bid requests associated with respective target geographic regions, as discussed below regarding real-time bidding module 880. The initial pacing score for each target geographic region may be adjusted over time, as discussed below regarding pacing score adjustment module 870.

Real-time bidding module 880, with may be executed by one or more bidders 36 of bidding system 20, is configured to make real-time bidding decisions on RTB bid requests received from one or more RTB exchanges 16. The bidding algorithm for each bid request is explained as follows. At 881, a bidder 36 receives a bid request from a particular RTB exchange 16. At 882, the bidder makes one or more bidding decisions (e.g., whether to submit a bid and/or a bid price for a bid to be submitted) for at least some of the received bid requests based at least on the pacing score for the geographic region associated with the respective bid request. For example, bidder 36 may first determine based on identifying information in the bid request whether the bid request is associated with one of the target geographic regions for the campaign. If not, the bid request is not considered for that campaign. However, if the bid request is associated with one of the target geographic regions for the campaign, bidder 36 may evaluate the current pacing score for that target geographic region, along with various other input data (e.g., a placement score regarding the placement identified in the bid request and/or a user score associated with an end user identified based on identifying information in the bid request) to determine whether to submit a bid. An example bidding decision algorithm is discussed in detail below with reference to example algorithm 950 shown in FIG. 7.

For each winning bid submitted for the campaign, an impression associated with the campaign is delivered to a respective end user. At 883, dynamic pacing system 34 may record each impression delivery instance (and details thereof, e.g., the relevant identifying identification included in the bid request, the target geographic region associated with the bid request, the time of the bid request, etc.) as impression delivery data stored in memory associated with bidding system 20.

In parallel with the execution of real-time bidding module 880 by bidder(s) 36, dynamic pacing system 34 may execute pacing score adjustment algorithm 870 at any suitable time(s) and/or frequency, to adjust the pacing scores associated with respective target geographic regions (e.g., wherein the first adjustment to each pacing score is made to the initial pacing score and each subsequent adjustment comprises a further adjustment to the current (adjusted) pacing score.

At 871, dynamic pacing system 34 may automatically adjust the current pacing score (stored at 890) for each geographic region over time (e.g., during the execution of the campaign), based on the impression delivery performance to date for each respective geographic region, which may be determined from the impression delivery data for each target geographic region collected at 883. For example, if a particular geographic region is being over-served with respect to the target impression volume budgeted for that geographic region, dynamic pacing system 34 may automatically adjust (e.g., decrease) the pacing score for that geographic region in order to increase the rate of impression purchasing/delivery to that geographic region, with the goal of achieving the target impression volume.

As mentioned above, dynamic pacing system 34 may adjust each pacing score using any suitable control system or algorithm. For example, dynamic pacing system 34 may employ a control process to calculate the direction and magnitude of adjustments to each geographic region pacing score. In some embodiments, system 34 may use a proportional-integral-differential (PID) control process for dynamically controlling each geographic region pacing score (or alternatively, a proportional-integral (PI) control process, without derivative-based control or a proportional derivative (PD) control process, without the integral-based control).

In one embodiment, such PI, PID, or PD controller for controlling the pacing score for each geographic region may receive as inputs (a) the current pacing score, (b) a number of impressions delivered to the respective geographic region (based on stored impression delivery data for the respective geographic region), and (c) a target impression volume for the respective geographic region, and output a new current pacing score (i.e., an adjusted pacing score) based on such inputs. In some embodiments in which dynamic pacing system 34 provides PID (or PI or PD) control of both a pacing threshold value and geographic region pacing scores, the PID (or PI or PD) control for the two parameters may be performed independently, e.g., by distinct controllers.

In addition, dynamic pacing system 34 may adjust the current pacing score for particular geographic regions over time (e.g., during the execution of the campaign), based on adjustments to the geographic region-level target impression volume assigned to the respective target geographic regions.

For example, for a multi-store campaign, system 34 may increase (automatically or as defined by a user) the store-level target impression volume assigned to a particular store, and accordingly increase the target impression volume distributed to each target geographic region associated with that store. An example algorithm for performing such adjustments is discussed below with reference to algorithm 900 shown in FIG. 6.

The adjusted pacing score for each target geographic region may be stored in memory at 890 (e.g., by overwriting the currently stored pacing score for the respective geographic region), such that the bidder(s) 36 may implement the adjusted pacing scores for subsequently received bid requests.

Figure 6:
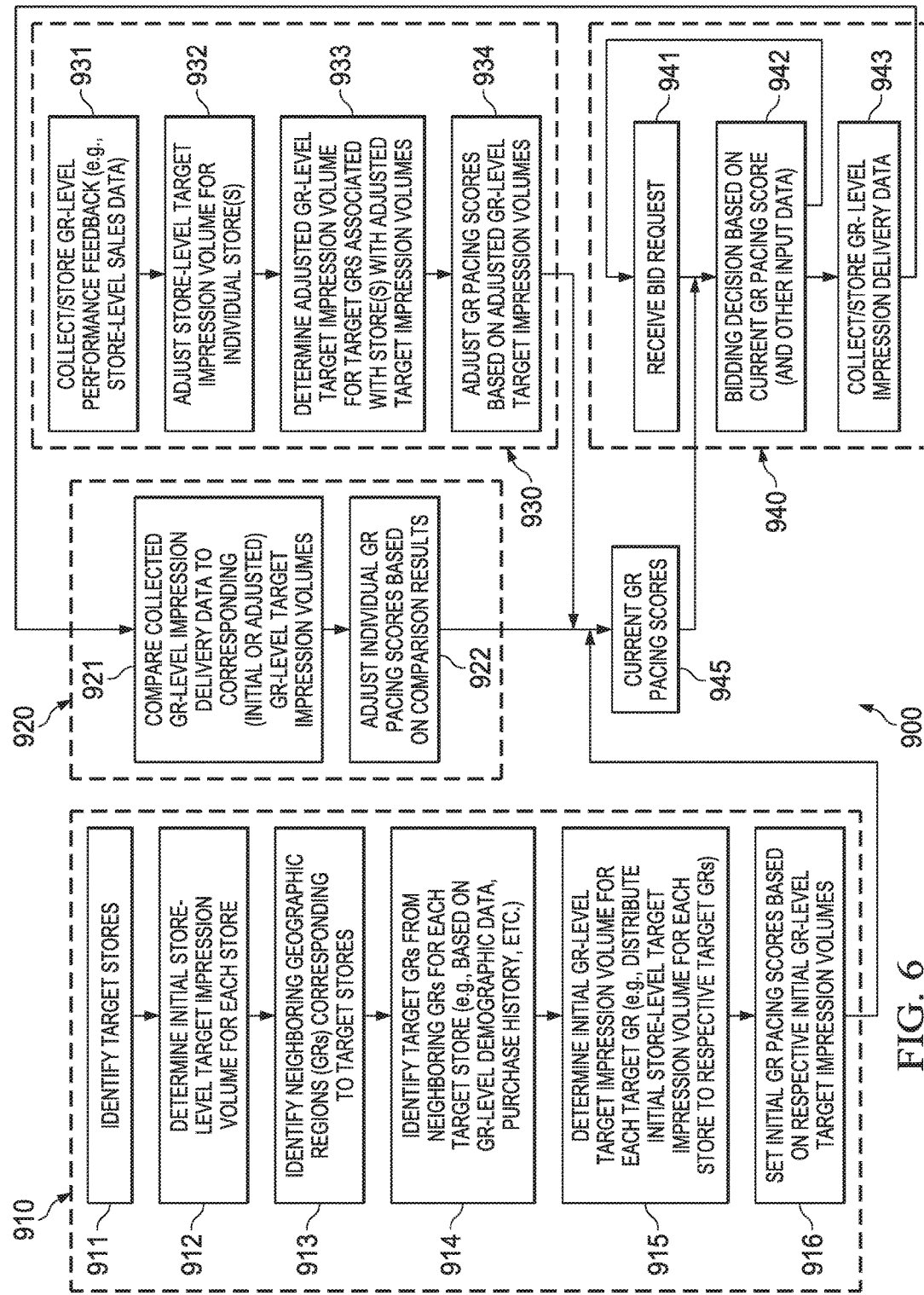
FIG. 6 illustrates another example algorithm for setting and dynamically adjusting geographic region-specific pacing scores for controlling the pace of impression delivery to a plurality of target geographic regions for a particular campaign, according to one embodiment.

FIG. 6 illustrates another example algorithm 900 for setting and dynamically adjusting geographic region-specific pacing scores for controlling the pace of impression delivery to a plurality of target geographic regions for a particular campaign. In some embodiments, algorithm 900 may be embodied in software or other executable code stored in memory and executable by processors of dynamic pacing system 34 and bidder(s) 36 of bidding system 20.

Algorithm 900 may be similar to algorithm 850, but further including a process (sub-algorithm) for adjusting pacing scores for target geographic regions based on performance feedback such as store-level sales data, for example. Algorithm 900 may includes multiple modules, including an initial pacing score module 910, an impression delivery related pacing score adjustment module 920, a performance data related pacing score adjustment module 930, a real-time bidding module 940, and a current pacing score storage module 945. Modules 910, 920, 930, and 940 are related but may be executed semi-independently of each other by dynamic pacing system 34 and bidder(s) 36. Impression delivery related pacing score adjustment module 920 (executed by dynamic pacing system 34), performance data related pacing score adjustment module 930 (executed by dynamic pacing system 34), and real-time bidding module 940 (executed by bidder(s) 36) may be executed in parallel and at any suitable frequencies.

Initial pacing score module 910 may be similar to initial pacing score module 860 of algorithm 850 discussed above. That is, initial pacing score module 910 may generate initial pacing scores for target geographic regions, which may be stored in memory 945 accessible to bidder(s) 36 for making real-time bidding decisions at 942.

Real-time bidding module 940 may be similar to pacing real-time bidding module 880 of algorithm 850 discussed above. Thus, at step 942, a respective bidder 36 may make bidding decisions for received bid requests based at least on respective pacing scores accessed from memory 945.

Impression delivery related pacing score adjustment module 920 may be similar to pacing score adjustment module 870 of algorithm 850 discussed above. That is, impression delivery related pacing score adjustment module 920 may be configured to adjust respective pacing scores based on impression delivery data for respective target geographic regions, e.g., collected at step 940. The adjusted pacing scores may be stored in memory 945 for implementation by bidder(s) 36.

Performance data related pacing score adjustment module 930 may be configured to adjust relevant target impression volumes and/or pacing scores for corresponding target geographic region, based on collected performance data, e.g., store-level sales data. At 931, dynamic pacing system 34 may receive performance data, e.g., store-level sales data, in any suitable manner, e.g., directly from individual stores, from a data aggregator entity, from a third party, or from any other data source. In some embodiments, system 34 may receive such data automatically and periodically via communications link(s) with individual stores or with a company-level sales data server (e.g., collecting sales data from multiple or all stores).

At 932, system 34 may adjust the store-level target impression volume for one or more stores, e.g., as specified by a user, or automatically adjusted by system 34 based on the received performance data and according to defined adjustment rules or algorithm. For example, system 34 may automatically increase or decrease the store-level target impression volume as a function of a percentage increase or decrease in sales for particular product(s), overall store sales, or other performance data related metric. The store-level target impression volume adjustments may or may not affect the campaign-level total impression volume. For example, a campaign rule may specify that the campaign-level total impression volume is static, such that any target impression volume increases to one or more stores much be countered by equivalent target impression volume increases to one or more other stores. Alternatively, a campaign rule may allow the campaign-level total impression volume to change over time, e.g., as a result of adjustments to store-level target impression volumes.

At 933, system 34 may adjust the target impression volumes for target geographic regions associated with stores for this the target impression volume was adjusted (at 932), according to any suitable rules or algorithm. For example, for each store having an adjusted target impression volume (at 932), system 34 may adjust the target impression volumes for each associated target geographic region on a proportional or pro rata basis. For instance, if the target impression volume for the store is increased by 20% (at 932), system 34 may increase the target impression volumes for each associated target geographic region by 20%.

At 934, system 34 may adjust the pacing score(s) for relevant target geographic region based on the target impression volume adjustments performed at 933. For example, system 34 may calculate an adjustment to each pacing score based on (a) the number of impressions delivered to date for the respective geographic region, (b) the number of remaining impressions to be delivered to the respective geographic region (based on the adjusted target impression volume), and (c) the time remaining in the campaign (or other defined duration or point in time for achieving the target impression volume).

Each pacing score adjusted at 934 may be stored in memory at 945 (e.g., by overwriting the currently stored pacing score for the respective geographic region), such that the bidder(s) 36 may implement the adjusted pacing scores for subsequently received bid requests.

algorithm 900 may be embodied in software or other executable code stored in memory and executable by processors of dynamic pacing system 34 and bidder(s) 36 of bidding system 20.

Impression delivery related pacing score adjustment module 920 and performance data related pacing score adjustment module 930 may be executed in parallel and at any suitable times or frequencies (e.g., independent of each other) to adjust the pacing scores of one or more target geographic regions over time.

FIG. 7 illustrates an example bidding decision algorithm 950 for making bidding decisions for a particular campaign based at least on dynamically adjusted pacing scores associated with respective geographic regions, according to one embodiment. In some embodiments, algorithm 950 may be embodied in software or other executable code stored in memory and executable by processor(s) of one or more bidders 36 of bidding system 20.

Example algorithm 950 uses a pacing score associated with a geographic region, along with a placement score, a user score, (optionally) a time of day adjustment, and a current pacing threshold as inputs for making a real-time decision of whether to submit a bid. It should be understood that this group of inputs is an example only, and that algorithm 950 or other bidding decision algorithm(s) implemented by bidder(s) 36 may use any other input(s), along with the relevant geographic region pacing score, for making real-time bidding decisions.

Turning to example algorithm 950 shown in FIG. 7, at 951, a bidder 36 receives a bid request from an RTB exchange 16 via network 24. The bid request may include including (a) placement information regarding an online placement in digital content being loaded or rendered by an end user device (including, e.g., the domain or web page including the placement, a size of the placement, a location of the placement relative to the web page, etc.), and (b) identification information associated with the end user device and/or code running on the end user device (e.g., an IP address, browser cookie, mobile advertising ID, browser identifier, operating system identifier, geographic location information (e.g., GPS information), etc.).

At 952, bidder 36 may determine or calculate a placement score for the placement identified in the bid request, e.g., based on the placement information in the bid request. The placement score may indicate an attractiveness of the placement relative to the particular campaign being executed by bidder 36.

At 953, bidder 36 may identify a geographic region associated with the bid request based on one or more user identifiers included in the bid request, e.g., an IP address, browser cookie, mobile advertising ID, etc. For example, bidding system 20 may maintain a database mapping user identifiers to defined geographic regions, such that bidder 36 may identify the geographic region mapped to the user identifier(s) included in the bid request. At 954, bidder 36 may determine whether the identified geographic region is a target geographic region for the particular campaign, e.g., using a look-up table.

In other embodiments, dynamic pacing system 34 or other component of bidding system 20 may supply bidder 36 with a list of user identifiers associated with target geographic regions for the particular campaign, such that steps 952 and 953 may be combined into a single step, e.g., a single look-up action.

If the identified geographic region is not a target geographic region for the particular campaign, the bid request is not considered for the campaign and the algorithm returns to step 951 to process the next incoming bid request. Alternatively, if the identified geographic region is a target geographic region for the particular campaign, the algorithm may continue for further analysis of the bid request. At step 955, bidder 36 may identify the current pacing score for the identified target geographic region, which may be maintained in memory accessible to bidder 36, e.g., as discussed above regarding algorithms 850 and 900.

At 956, in some embodiments or for some campaigns, bidder 36 may apply a time of day adjustment to the pacing score identified at 955. For example, the time of day adjustment may specify a mathematical adjustment to the pacing score as a function of the time of day. The time of day adjustment may be a function of geography as well. For example, the campaign may specify that a time of day adjustment be applied only to pacing scores for geographic regions in New York City.

At 957, bidder 36 may determine or calculate a user score based on the end user (or end user device) associated with the bid request. For example, bidder 36 may identify an end user (or end user device) based on identification information included in the bid request (e.g., IP address, cookie, mobile advertising ID, etc.) and access or calculate in real-time a user score for the identified end user, e.g., based on a statistical correlation between characteristic data of the end user (e.g., demographic data, interest topic data, geographic location, online activity, purchase history, physical traffic history, etc.) and characteristic data or parameters of the particular campaign. Thus, the user score may indicate an attractiveness of the user for the particular campaign.

At 958, bidder 36 may calculate an overall bid score based on the placement score, pacing score (associated with the identified target geographic region), time of day adjustment (if appropriate), and user score. Bidder 36 may calculate the overall bid score using any suitable rules or algorithm, e.g., adding or multiplying the various inputs to each other, wherein each input may or may not be individual weighted.

At 960, bidder 36 may access a pacing threshold and compare the overall bid score to the pacing threshold to determine whether to submit a bid. In some embodiments, the pacing threshold may comprise the current value of a dynamically adjusted pacing threshold (e.g., using a PI or PID controller as discussed herein). If the overall bid score is equal to or greater than the pacing threshold, bidder 36 may determine a bid price according to any suitable rules or algorithm and submit a bid to the respective RTB exchange 16, as indicated at 961. If not, bidder 36 may decline to submit a bid. The algorithm may then return to 951 to process the next incoming bid request.

As mentioned above, dynamic in some embodiments, pacing system 34 may use a PID controller, PI controller, or PD controller to dynamically adjust the pacing score for each target geographic region for a campaign.

Figure 8:
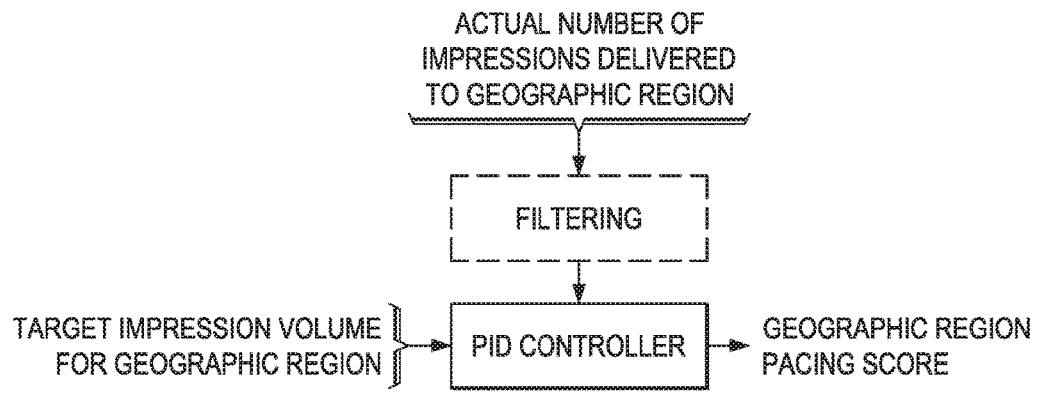
FIG. 8 illustrates an example PID controller for dynamically adjusting a geographic region pacing score, according to one embodiment.

FIG. 8 illustrates an example PID control process for dynamically controlling the pacing score for a particular geographic region. As shown, the PID controller may receive two inputs: (a) a target impression volume for the particular geographic region for a specified time segment (e.g., one hour or one day) and (b) an actual number of impressions delivered to the particular geographic region during the specified time segment, and output a new pacing score for the particular geographic region, which may define an adjustment from a current pacing score known to the controller. In some embodiments, the actual number of delivered impressions may be filtered, e.g., to manage outlier data or rapid variations or spikes in the data. For example, in some embodiments, dynamic pacing system 34 may employ a Kalman smoothing filter or other smoothing filter to the actual number of impressions delivered to the particular geographic region.

Campaign-Level Pacing of Impression Purchasing/Delivery

As mentioned above, in some embodiments, production system 32 may provide a delivery plan to dynamic pacing system 34, which may dynamically calculate a campaign-level pacing threshold value based on the delivery plan. For example, production system 32 may generate one or more campaign-level "target delivery profiles" (also referred to as target delivery profiles) for dynamically controlling the rate of impression purchasing over the duration of the campaign, wherein the pacing threshold is dynamically adjusted according to the target delivery profile currently implemented by dynamic pacing system 34 (e.g., via a PID control that takes the target delivery profile as an input and outputs the pacing threshold). As discussed below, in some embodiments dynamic pacing system 34 may dynamically adjust the target number of purchased impressions for individual time segments in real-time or substantially in real-time using control loop feedback, e.g., as implemented using a PID controller or PI controller. Partitioning the delivery plan into the smaller time segments may allow dynamic pacing system 34 to manage the impression purchasing process more accurately.

Figure 9:
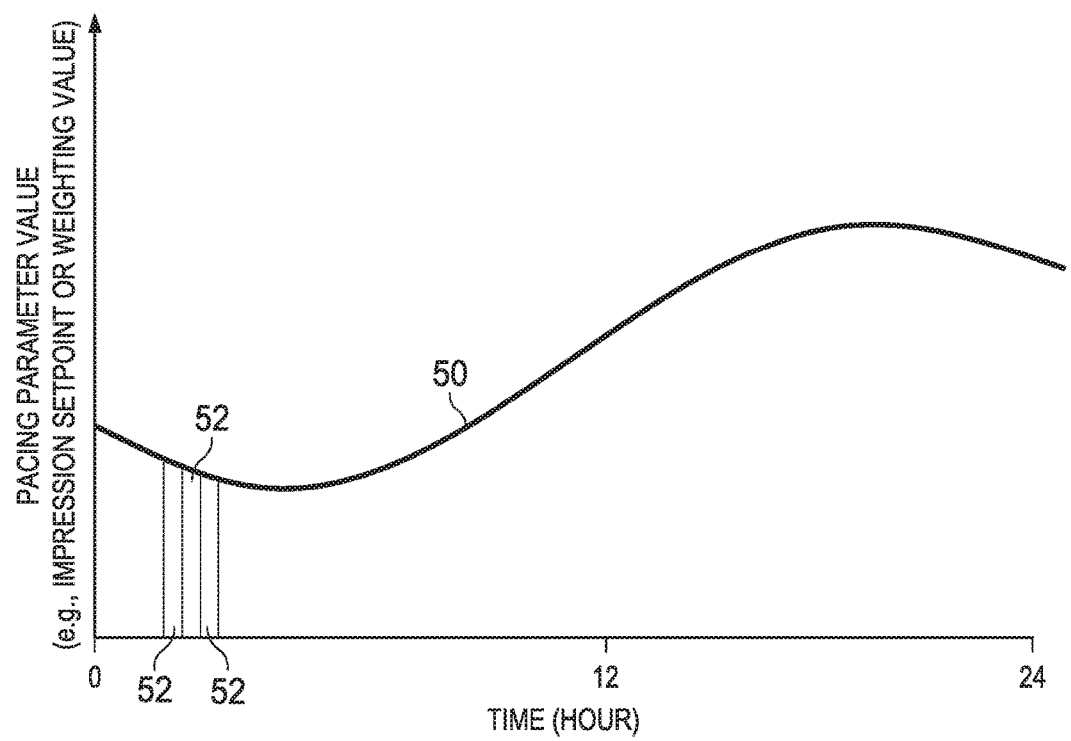
FIG. 9 illustrates an example target delivery profile divided into a series of time segments, according to one embodiment.

A "target delivery profile" is a time-based profile of one or more pacing parameters related to a target rate of impression purchasing over a defined time period (the profile duration) during a campaign. The profile duration of a target delivery profile may be divided into a series of smaller time segments (e.g., a series of 1 hour time segments within a 24-hour target delivery profile, or a series of 1 minute time segments within a 1-hour target delivery profile), with the target delivery profile defining a value or values for each relevant pacing parameter for each time segment, wherein the parameters values may be constant or may vary from each time segment to the next. The parameters value(s) defined by the target delivery profile for the series of time segments define a curve, or "profile," when plotted as parameters value(s) versus time, e.g., as shown in FIG. 9 and discussed below.

A pacing parameter may comprises any parameter, characteristic, or variable that influences the rate of purchasing by bidding system 20. For example, the pacing parameter may represent the number of impressions to be purchased. Thus, a target delivery profile may define, for each time segment (e.g., 1 hour) of the profile duration (e.g., 24 hours), a target number of impressions to be purchased during that time segment.

As another example, the pacing parameter may represent a proportion or set of proportions of a total number of impressions to be purchased for a period of time. Thus, a target delivery profile may define, for each time segment, a target proportion of a total number of impressions to be purchased during the profile duration. The target proportion of impressions may be may be represented by a set of weighting values assigned to the series of time segments, such that each individual time segment is weighted (by a specified weighting value) relative to the other time segments based on the proportion of the total impression purchases specified for that individual time segment. Thus, in such embodiments, a target delivery profile is compiled and stored as a set of weights, rather the actual number of impression to be served, as the total number of impressions to be purchased depends on the number of impressions that were actually purchased/served at the end of the previous time segment.

For example, assume a 10-day campaign that uses a different 24-hour target delivery profile during each day, with each 24-hour target delivery profile divided into 1-hour segments. Further assume that during Day 3 of the campaign, the actual number of impressions purchased during Hour 7 falls 2,000 impressions short of the target specified for that hour. Thus, there are now 2,000 additional impressions to be served for the remaining duration of the campaign, as compared to the original projection for this point during the campaign.

Production system 32 may then dynamically compute the target number of impressions to be purchased for the campaign in the next hour (Hour 8) to make up for this 2,000 impression shortfall. For example, production system 32 may dynamically compute the target number of impressions to be purchased during Hour 8 of Day 3 (and similarly for each hour of the campaign) according to the following algorithm. First, production system 32 updates the count of the remaining number of impressions to be served during the remainder of the campaign (i.e., adds 2,000 to the count).

Production system 32 then reallocates this updated count over the remaining days of the campaign, based on an original number or proportion of the total impression purchases for the campaign assigned to each day, e.g., as defined by the proportions or weights specified by the target delivery profiles of the respective days. For example, the reallocation of the updated count may allocate the additional required 2,000 impression purchases over the remaining days as follows: remainder of Day 3=+150 impressions; Day 4=+200 impressions; Day 5=+400 impressions; Day 6=+400 impressions; Day 7=+350 impressions; Day 8=+300 impressions; Day 9=+200 impressions; Day 10=+100 impressions.

Production system 32 then re-allocates the target number of impressions for the remainder of Day 3 based on the updated allocation for Day 3, specifically +150 impressions. Production system 32 may allocate this target number according to the proportions or weights specified by the Day 3 target delivery profile for each remaining hour of Day 3, such that the target number of impressions for each remaining hour of Day 3 is proportionally increased by some portion of the 150 additional impressions.

Thus, by storing a set of proportions or weights as each target delivery profile, production system 32 may apply an algorithm such as discussed above to dynamically determine target numbers of impression purchases for remaining time periods during a campaign, e.g., to dynamically account for or compensate for the past and current performance of the onoing campaign.

FIG. 9 illustrates an example of a campaign-level target delivery profile 50 generated by production system 32. Example target delivery profile 50 defines a profile duration of 24 hour period, which is divided into 1,440 one-minute time segments 52 (not shown to scale), and defines a pacing parameter value for time segment 52. As discussed above, the target delivery profile 50 may explicitly define a target number of impression purchases for each time segment 52, referred to herein as the "impression setpoint" for that time segment 52. Alternatively, as discussed above, the target delivery profile 50 may define a value of a weight or proportion for each time segment 52 that represents a proportion of a total target number of impression purchases assigned to that time segment 52, and from which the target number of impression purchases (impression setpoint) for each respective time segment 52 is dynamically calculated by production system 32, e.g., as discussed above regarding the example 10-day campaign. In other embodiments, the target delivery profile 50 may define any other pacing parameter value(s) from which an impression setpoint can be calculated for each time segment 52, or any other pacing parameter value(s) from which dynamic pacing system 34 may dynamically control a pacing threshold value, or any other pacing parameter value(s) that may be used by bidding server 30 for making bidding decisions and, in particular, to control the pace of bidding purchases.

Thus, in some embodiments, a campaign-level target delivery profile may directly specify a target number of impression purchases for a campaign, i.e., an impression setpoint, for each time segment, or may specify one or more other pacing parameter values from which the target number of impression purchases, i.e., impression setpoint, for each time segment is calculated by bidding system 20. It should be understood that any reference herein to a target delivery profile defining target impression purchase numbers or impression setpoints refers to a target delivery profile that either specifies impression setpoints (target impression purchase numbers) directly, or specifies one or more other pacing parameter values from which impression setpoints (target impression purchase numbers) can be calculated.

As discussed above, the target delivery profile 50 may be generated based on any suitable data, e.g., known time-dependent information, such as a dynamic internet activity curve, a dynamic traffic curve for a particular website, a dynamic online traffic curve for users in a particular geographic region, or any other suitable data.

In some embodiments, target delivery profile 50 may be repeatedly replaced by a new, dynamically generated target delivery profile 50 after completion of each profile duration. For example, where the target delivery profile has a 24 hour (1 day) duration, the target delivery profile may be replaced by a new, dynamically generated target delivery profile every day. Thus, the shape of the target delivery profile may change from day to day, e.g., based on differences in known or expected internet activity patterns corresponding to the respective days. In addition, the magnitude of the target delivery profile may change from day to day, e.g., based on tracked performance of the ongoing campaign (e.g., where the tracked performance is ahead of or behind schedule for the campaign).

Dynamic pacing system 34 may dynamically calculate a campaign-level pacing threshold value designed to control the pace of impressions purchases over time such that the actual purchasing performance tracks the target delivery profile over time. For example, dynamic pacing system 34 may dynamically calculate the pacing threshold value based on the target number of purchased impressions for each time segment, and the ongoing performance of the campaign (e.g., number of impressions purchased in previous time segment(s)), and/or other relevant input data. In some embodiments, dynamic pacing system 34 may dynamically calculate the pacing threshold value in real-time or substantially in real-time (e.g., for each successive time segment) using control loop feedback, e.g., as implemented using a PID controller or PI controller.

Bidding server 30 may then determine whether to bid on each incoming bid request based on a comparison of the bid request score for that bid request and the current pacing threshold value as calculated by dynamic pacing system 34. For each bid request, bidding server 30 may determine to bid on the bid request if the respective bid request score is greater than or equal to the current pacing threshold value, calculate a corresponding bid price using any suitable model or algorithms, and communicate a bid response including the details of the bid to RTB exchange server 16, which may then determine a winning bid for the bid request, e.g., by comparing the respective prices of bid requests received from multiple different bidding systems 20, as discussed above.

Thus, in some embodiments, the bidding process for online advertisement impressions includes scoring bid requests for each ad placement/impression and deciding whether or not to bid on the impression based at least on the respective bid request score. For example, each bid request may be scored based on a relative level of desirability for purchasing the respective impression. Examples of such scores include a numerical score, a rank, a preference order, or a category to purchase or a general grouping concept. For example, each incoming bid request may be scored numerically on a scale from 0 to 20, from very undesirable (score=0) to very desirable (score=20). In another example embodiment, each incoming bid request is instead scored on a scale from 0 to 10. It is contemplated that any type of scoring schemes may be used to indicate a relative level of desirability without deviating from the present subject matter.

As discussed above, a dynamic pacing system may be employed to determine whether or not to bid on each bid request (and in some embodiments, a bid price for each bid) based on desirability scores calculated for the respective bid requests. In some embodiments, the present dynamic pacing system dynamically adjusts a pacing threshold value over time with the goals of (a) purchasing/serving a target number of online advertisements (impressions) in a particular time period, as defined by or based on the performance goals for a particular ad campaign, and (b) purchasing/serving the impressions according to a target delivery plan, e.g., by dynamically controlling the rate of impression purchases according to a target delivery profile or curves during the particular time period.

As discussed above, dynamic pacing system 34 may determine a pacing threshold value (e.g., from 0-20) for each time segment, in real-time or substantially in real-time (e.g., by adjusting the pacing threshold value used during the previous time segment or maintaining the same pacing threshold value) based on a target number of impressions to purchase for a given time period, e.g., that time segment, multiple time segments, the remainder of the campaign duration, or other relevant time period. The pacing threshold value set by the present dynamic pacing system 34 represents the minimum bid request score that bidding server 30 will bid on. In one embodiment, at the beginning of the campaign or some other starting point within the campaign, dynamic pacing system 34 sets the pacing threshold for the first time segment (e.g., 1 min segment) to a predefined initial value, e.g., the maximum score (e.g., 20) which represents the most desirable bid requests, thereby beginning with maximum purchasing selectivity.

In some embodiments, dynamic pacing system 34 may then periodically determine whether to update or maintain the current pacing threshold value. For example, dynamic pacing system 34 may periodically—e.g., after each time segment or after each N time segments—determine whether to adjust or maintain the pacing threshold value based at least on (a) the number of bids won (i.e., impressions purchased) during that time segment (or that time segment plus N previous time segments or all previous time segments), and (b) the target number of bids to win (impressions to purchase) in the next time segment, next N time segments, or all subsequent time segments in a defined period or the full campaign. For example, if the number of bids won in a particular time segment (or previous N time segments) exceeds the target number for such time segment(s), dynamic pacing system 34 may increase the pacing threshold value with the intent to win fewer impressions in subsequent time segment(s) and thereby steer the performance back toward the target delivery profile or other target metric.

The pacing threshold value represents a measure of purchasing aggressiveness by the bidding system 20. For example, a threshold value close to the minimum score (e.g., 0), provides aggressive purchasing, in which the bidding system typically has little difficulty winning (purchasing) the target number of impressions for a given campaign. Adjusting the pacing threshold values toward the maximum score (e.g., 20) decreases the aggressiveness of the purchasing, by increasing the selectivity of bid requests to bid on.

Dynamic pacing system 34 may also (e.g., in combination with the dynamic adjustment of the pacing threshold value) control purchasing aggressiveness, and thus the pace of purchasing over time, by selecting or controlling bid prices for placed bids over time. For example, dynamic pacing system 34 may increase purchasing aggressiveness, and thus the number of impressions won, by offering higher bid prices; or alternatively decrease purchasing aggressiveness, and thus the number of impressions won, by offering lower bid prices. Thus, dynamic pacing system 34 may simultaneously incorporate both dynamic pacing threshold value control and dynamic bid price control to regulate the rate of impressions purchased over time as desired, e.g., based on target metrics.

In some embodiments, to adjust the pacing threshold value and change bidding parameters based on bidding pacing, the dynamic pacing system 34 accounts for the number of impressions being won (purchased) at the current pacing threshold value. An example equation for determining a sum of a conditional expectation (sumE) of a number of impressions that are won at a particular pacing threshold value at a point in time provides:

$$\text{sumE}[I|T],$$

where I is a number of impressions that are being won and T is the pacing threshold value at a point in time.

Typically, determining the number of impressions won is measured on a noisy time series, such that adjusting the threshold value with confidence may be difficult. In such system, there is typically some uncertainty regarding the number of impressions that the bidding system is purchasing at a given threshold. The bidding system may buy more or fewer impressions because of a change to the pacing threshold value or a change in activity in a RTB exchange system (e.g., more advertisements available for purchase). Or, there could be a large random fluctuation in the time series. In one embodiment, in order to more accurately estimate the number of bid requests that are being won, dynamic pacing system 34 applies a smoothing process to smooth a data set and separate the signal from the noise. For example, dynamic pacing system 34 may apply a calibrated Kalman filter to an observed time series. This model may provide a much more accurate representation of the number of impressions are being purchased at any given time segment or period.

In some embodiments, dynamic pacing system 34 employs a control process to calculate the direction and magnitude of adjustments to the pacing threshold value based at least in part on such Kalman-filtered (or otherwise filtered or smoothed) data. As an example of such control process, dynamic pacing system 34 may employ a proportional-integral-differential (PID) control process for dynamically controlling the pacing threshold value (or alternatively, a proportional-integral (PI) control process, without derivative-based control or a proportional derivative (PD) control process, without the integral-based control).

The PID control process takes in an error value and outputs a change variable (thereby implementing a "velocity controller") or a raw output value (thereby providing a "positional controller"), depending on the particular embodiment. For example, in some embodiments, dynamic pacing system 34 employs a PID controller that takes in a calculated difference between a Kalman-estimated number of bids won/impressions served and a target number of bids won/impressions served, and outputs an adjustment to the pacing threshold value, or alternatively, outputs the actual value of the pacing threshold value. The PID control process is an online process, i.e., the PID control process computes input data serially, and thus need not run over historical data, and further relies on current information that is updated to reflect the current error.

The PID control utilized by dynamic pacing system 34 may incorporate any or all of the technical concepts disclosed at http://en.wikipedia.org/wiki/PID_controller as of the date of filing of this application, which disclosure is included herein at the end of the Detailed Description section and in FIGS. 13A-13E.

Figure 10:
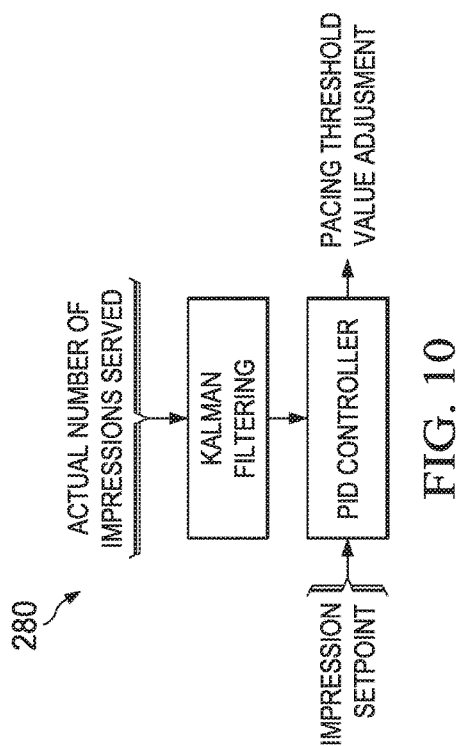
FIG. 10 illustrates an example PID controller for dynamically adjusting a campaign-level pacing threshold value, according to one embodiment.

FIG. 10 illustrates a PID controller 280 of dynamic pacing system 34, according to one embodiment. As shown, PID controller 280 receives as inputs (a) the target number of impressions served for each time segment (referred to herein as the "impression setpoint"), e.g., as defined by a segmented target delivery profile, and (b) the actual number of impressions served in such time segments, calculates a difference between the impression setpoint and actual impressions served, referred to as the "error," and calculates and outputs an adjustment to the pacing threshold value. Alternatively, the PID controller may take inputs (a) as the target number of impression served for each time segment, and (b) the actual number of impression served in such time segments, calculate the error, and calculate the output as the actual pacing threshold. Thus, with reference to FIG. 9, the impression setpoint for each time segment 52 is the target number of impressions purchased (bids won) for that time segment, as defined by or calculated based on the target delivery profile 50. Further, as shown in FIG. 10, the impressions served data may be filtered using a Kalman filter as discussed above, or otherwise filtered or smoothed using any suitable algorithm. PID controller 280 may account for the previous adjustment to the pacing threshold value and adjust the pacing threshold value based on various factors, e.g., the proportion of the last error, the sum (or integral) of previous errors, and the differential change in the error from the previous time period to the current time period.

The PID controller 280 may embody the following equation, incorporating the P (proportional), I (integral), and D (derivative) components:

$$K_P*(\text{error}) + K_I*\int(\text{error}) + K_D*d(\text{error})/dt$$

wherein $K_P$, $K_I$, and $K_D$ are tuning constants

Thus, the Proportional component, $K_P*(\text{error})$, is directly proportional to the error. The Integral component, $K_I*\int(\text{error})$, integrates the error over time, and thus acts as a continuous memory. The Derivative component, $K_D*d(\text{error})/dt$, represents the change in error over time. The tuning constants $K_P$, $K_I$, and $K_D$ can be tuned (e.g., adjusted by a user or automatically by dynamic pacing system 34) to provide a desired response, e.g., minimizing error by providing a fast response with little overshoot.

According to standard PID control techniques, HD controller 280 may calculate and use the "raw error" as the "error" term shown above, with the "raw error" defined as the mathematical difference between the actual number of impressions served for a particular time period (e.g., a time segment or N time segments) and the impression setpoint (i.e., target number of impressions served) for that time period.

However, in some embodiments, PID controller 280 may calculate and use a "relative error" as the "error" term shown above, with the "relative error" defined as the raw error for a particular time period divided by the impression setpoint for that time period:

Relative error=(raw error for time $x$)/(impression setpoint for time $x$)

The inventors have discovered that this approach simplifies the ability to tune PID controller 280, e.g., where PID controller 280 is used for multiple different ad campaigns. Thus, using the relative error instead of the raw error provides a cross-campaign standardized tuning technique.

Figure 11:
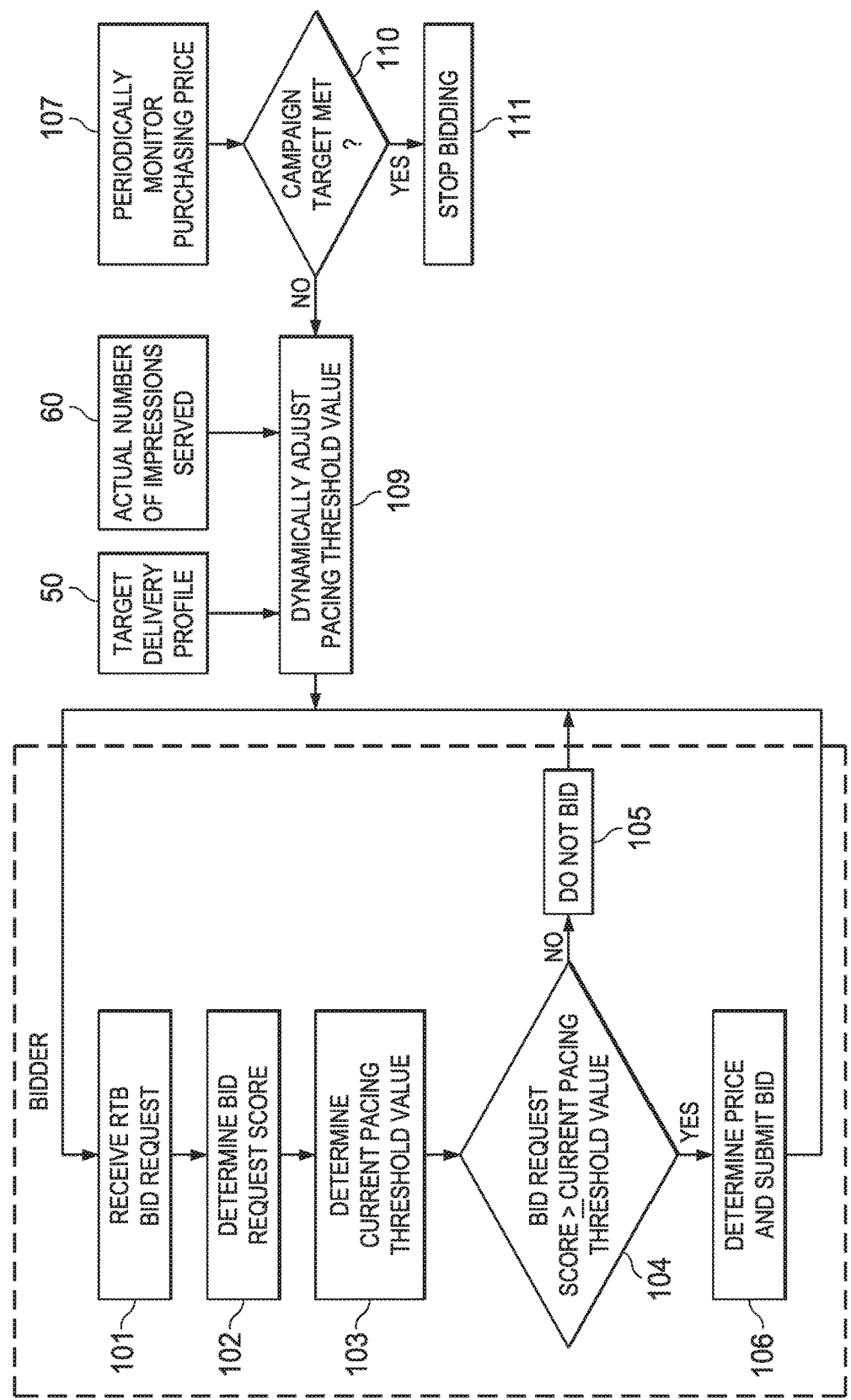
FIG. 11 illustrates a flowchart for an example method for controlling purchasing using a dynamically adjusted geographic region pacing scores and a dynamically adjusted campaign-level pacing threshold value, according to one embodiment.

FIG. 11 illustrates a flowchart for a general method for dynamically controlling a pacing of purchasing for an online advertisement campaign in an RTB system, according to some embodiments. At step 101, bidding system 20 receives a real-time bid request from RTB exchange system 16 for an ad placement in a webpage or other digital content being loaded or rendered by an end user device. A bidder 36 scores the real-time bid request at step 102, e.g., based on rules supplied by production system 32. The bid request score indicates a desirability of the respective ad placement with respect to the online advertisement campaign, as discussed above.

As discussed above, in some embodiments, bidder 36 calculates the bid request score based on the relevant geographic region pacing score (i.e., corresponding to the geographic region associated with the end user/end user device) and one or more other parameters, such as a user score and/or a placement score, for example.

Bidder 36 determines the current pacing threshold value for the ad campaign at step 103, which value may be periodically determined and adjusted by dynamic pacing system 34 as discussed above. Bidder 36 then compares the bid request score with the current pacing threshold value at step 104 to determine whether to bid on the placement identified by the bid request. If the bid request score fails to satisfy (e.g., is less than) the current pacing threshold value, bidder 36 determines to not bid on the bid request at step 105, and the process returns to step 101 to process further incoming bid request. Alternatively, if the bid request score satisfies (e.g., is greater than or equal to) the current pacing threshold value, bidder 36 generates and communicates a bid to the RTB exchange system 16 at step 106. Bidder 36 may determine a price for the bid using any suitable data and algorithms.

As the ad campaign continues and bid requests are processed and either bid on or passed on, dynamic pacing system 34 periodically monitors the purchasing pace for the campaign over time based on the number of impressions won for a given time period at step 107. Dynamic pacing system 34 may monitor the pace at any desired frequency, e.g., every time segment (e.g., every 1 min), every N time segments, upon a predefined triggering event, or according to any other specified frequency or times. At step 108, dynamic pacing system 34 determines whether the goal of the online ad campaign (e.g., total number of impressions served) has been met. If the goal has not been met, dynamic pacing system 34 dynamically adjusts the pacing threshold value, if appropriate, based on various factors, e.g., a target delivery profile 50, the determined purchasing pace, one or more campaign goals or settings, etc., at step 109. In some embodiments, e.g., as discussed above, the pacing threshold value is adjusted based at least on (a) a dynamically changing "impression setpoint" defined by or calculated from a target delivery profile 50 (which may be dynamically generated) and (b) an actual number of impressions served during one or more specified time periods, indicated at 60. The dynamically adjusted pacing threshold value is then used for evaluating subsequent incoming bid requests, as indicated by the arrow from step 109 to step 101, until the next adjustment of the pacing threshold value. Once the goal of the ad campaign is met, bidding system 20 stops bidding at step 110.

Figure 12:
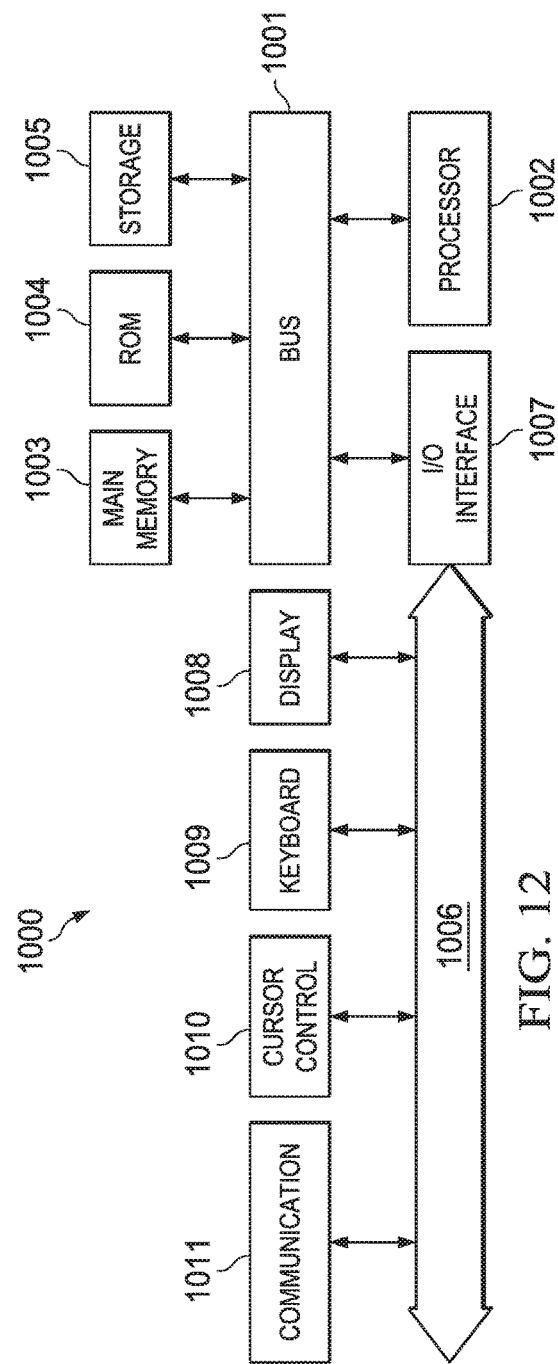
FIG. 12 illustrates an example computer architecture that may be used for embodiments of the present system.

FIG. 12 illustrates an example computer architecture that may be used for the present system, according to one embodiment. The example computer architecture may be used for implementing one or more components described in the present disclosure including, but not limited to, the present system. One embodiment of architecture 1000 includes a system bus 1001 for communicating information, and a processor 1002 coupled to bus 1001 for processing information. Architecture 1000 further includes a random access memory (RAM) or other dynamic storage device 1003 (referred to herein as main memory), coupled to bus 1001 for storing information and instructions to be executed by processor 1002. Main memory 1003 also may be used for storing temporary variables or other intermediate information during execution of instructions by processor 1002. Architecture 1000 may also include a read only memory (ROM) and/or other static storage device 1004 coupled to bus 1001 for storing static information and instructions used by processor 1002.

A data storage device 1005 such as a magnetic disk or optical disc and its corresponding drive may also be coupled to architecture 1000 for storing information and instructions. Architecture 1000 can also be coupled to a second I/O bus 1006 via an I/O interface 1007. A plurality of I/O devices may be coupled to I/O bus 1006, including a display device 1008, an input device (e.g., an alphanumeric input device 1009 and/or a cursor control device 1010).

The communication device 1011 allows for access to other computers (e.g., servers or clients) via a network. The communication device 1011 may include one or more modems, network interface cards, wireless network interfaces or other interface devices, such as those used for coupling to Ethernet, token ring, or other types of networks.

The above example embodiments have been described herein above to illustrate various embodiments of implementing a system and method for estimating an advertisement impression volume. Various modifications and departures from the disclosed example embodiments will occur to those having ordinary skill in the art. The subject matter that is intended to be within the scope of the present disclosure is set forth in the following claims.

PID Controller Concepts

As discussed above, the PID control utilized by dynamic pacing system 34, e.g., for dynamically adjusting a campaign-level pacing threshold value and/or for dynamically adjusting pacing scores for geographic regions may incorporate any or all of the concepts disclosed at http://en.wikipedia.org/wiki/PID_controller as of the date of filing of this application. These concepts are reproduced below, and with reference to FIGS. 13A-13E.

A proportional-integral-derivative controller (PID controller) is a control loop feedback mechanism (controller) widely used in industrial control systems. A PID controller calculates an error value as the difference between a measured process variable and a desired setpoint. The controller attempts to minimize the error by adjusting the process through use of a manipulated variable.

The PID controller algorithm involves three separate constant parameters, and is accordingly sometimes called three-term control: the proportional, the integral and derivative values, denoted P, I, and D. Simply put, these values can be interpreted in terms of time: P depends on the present error, I on the accumulation of past errors, and D is a prediction of future errors, based on current rate of change. The weighted sum of these three actions is used to adjust the process via a control element such as the position of a control valve, a damper, or the power supplied to a heating element.

Figure 13A:
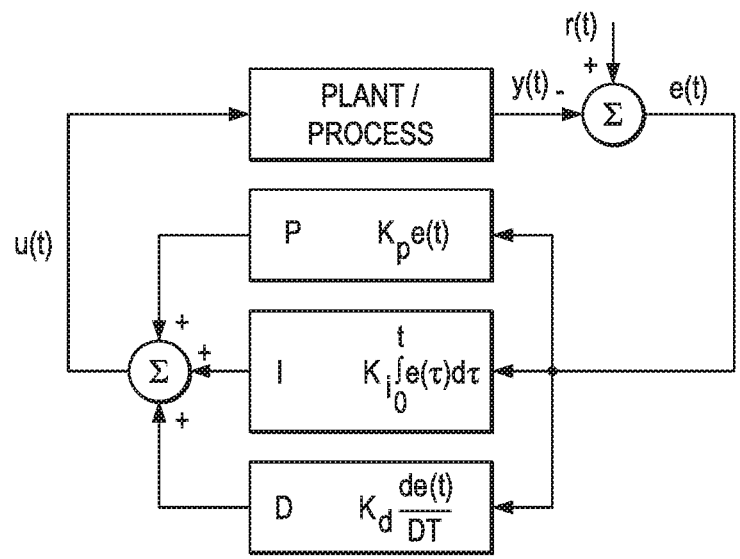
FIG. 13A shows a block diagram of a PID controller in a feedback loop.

FIG. 13A shows a block diagram of a PID controller in a feedback loop.

In the absence of knowledge of the underlying process, a PID controller has historically been considered to be the best controller. By tuning the three parameters in the PID controller algorithm, the controller can provide control action designed for specific process requirements. The response of the controller can be described in terms of the responsiveness of the controller to an error, the degree to which the controller overshoots the setpoint, and the degree of system oscillation. Note that the use of the PID algorithm for control does not guarantee optimal control of the system or system stability.

Some applications may require using only one or two actions to provide the appropriate system control. This is achieved by setting the other parameters to zero. A PID controller will be called a PI, PD, P or I controller in the absence of the respective control actions. PI controllers are fairly common, since derivative action is sensitive to measurement noise, whereas the absence of an integral term may prevent the system from reaching its target value due to the control action.

Control Loop Basics

A familiar example of a control loop is the action taken when adjusting hot and cold faucets to fill a container with water at a desired temperature by mixing hot and cold water. The person touches the water in the container as it fills to sense its temperature. Based on this feedback they perform a control action by adjusting the hot and cold faucets until the temperature stabilizes as desired.

The sensed water temperature is the process variable (PV). The desired temperature is called the setpoint (SP). The input to the process (the water valve position), and the output of the PID controller, is called the manipulated variable (MV) or the control variable (CV). The difference between the temperature measurement and the setpoint is the error (e) and quantifies whether the water in the container is too hot or too cold and by how much.

After measuring the temperature (PV), and then calculating the error, the controller decides how to set the tap position (MV). The obvious method is proportional control: the tap position is set in proportion to the current error. A more complex control may include derivative action. This considers the rate of temperature change also: adding extra hot water if the temperature is falling, and less on rising temperature. Finally integral action uses the average temperature in the past to detect whether the temperature of the container is settling out too low or too high and set the tap proportional to the past errors. An alternative formulation of integral action is to change the current tap position in steps proportional to the current error. Over time the steps add up (which is the discrete time equivalent to integration) the past errors.

Making a change that is too large when the error is small will lead to overshoot. If the controller were to repeatedly make changes that were too large and repeatedly overshoot the target, the output would oscillate around the setpoint in either a constant, growing, or decaying sinusoid. If the amplitude of the oscillations increase with time, the system is unstable. If they decrease, the system is stable. If the oscillations remain at a constant magnitude, the system is marginally stable.

In the interest of achieving a gradual convergence to the desired temperature (SP), the controller may damp the anticipated future oscillations by tempering its adjustments, or reducing the loop gain.

If a controller starts from a stable state with zero error (PV=SP), then further changes by the controller will be in response to changes in other measured or unmeasured inputs to the process that affect the process, and hence the PV. Variables that affect the process other than the MV are known as disturbances. Generally controllers are used to reject disturbances and to implement setpoint changes. Changes in feedwater temperature constitute a disturbance to the faucet temperature control process.

In theory, a controller can be used to control any process which has a measurable output (PV), a known ideal value for that output (SP) and an input to the process (MV) that will affect the relevant PV. Controllers are used in industry to regulate temperature, pressure, force, feed, flow rate, chemical composition, weight, position, speed and practically every other variable for which a measurement exists.

PID Controller Theory (for Parallel or Non-Interacting Forms of the PID Controller)

The PID control scheme is named after its three correcting terms, whose sum constitutes the manipulated variable (MV). The proportional, integral, and derivative terms are summed to calculate the output of the PID controller. Defining u(t) as the controller output, the final form of the PID algorithm is:

$$u(t) = MV(t) = K_p e(t) + K_i \int_0^t e(\tau) d\tau + K_d \frac{d}{dt} e(t) \quad (1)$$

where
$K_P$: Proportional gain, a tuning parameter
$K_i$: Integral gain, a tuning parameter
$K_d$: Derivative gain, a tuning parameter
e: Error=SP−PV
t: Time or instantaneous time (the present)
τ: Variable of integration; takes on values from time 0 to the present t.

Proportional Term:

The proportional term produces an output value that is proportional to the current error value. The proportional response can be adjusted by multiplying the error by a constant Kp, called the proportional gain constant.

The proportional term is given by:

$$P_{out} = K_p e(t) \quad (2)$$

A high proportional gain results in a large change in the output for a given change in the error. If the proportional gain is too high, the system can become unstable (see the section on loop tuning). In contrast, a small gain results in a small output response to a large input error, and a less responsive or less sensitive controller. If the proportional gain is too low, the control action may be too small when responding to system disturbances. Tuning theory and industrial practice indicate that the proportional term should contribute the bulk of the output change.

Figure 13E:
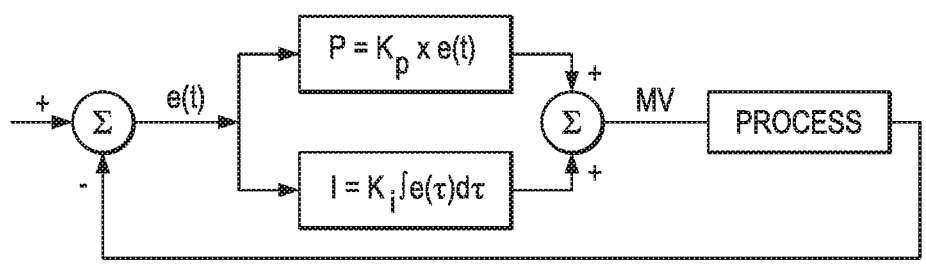
FIG. 13E shows a basic block diagram of a PI controller.
Figure 13B:
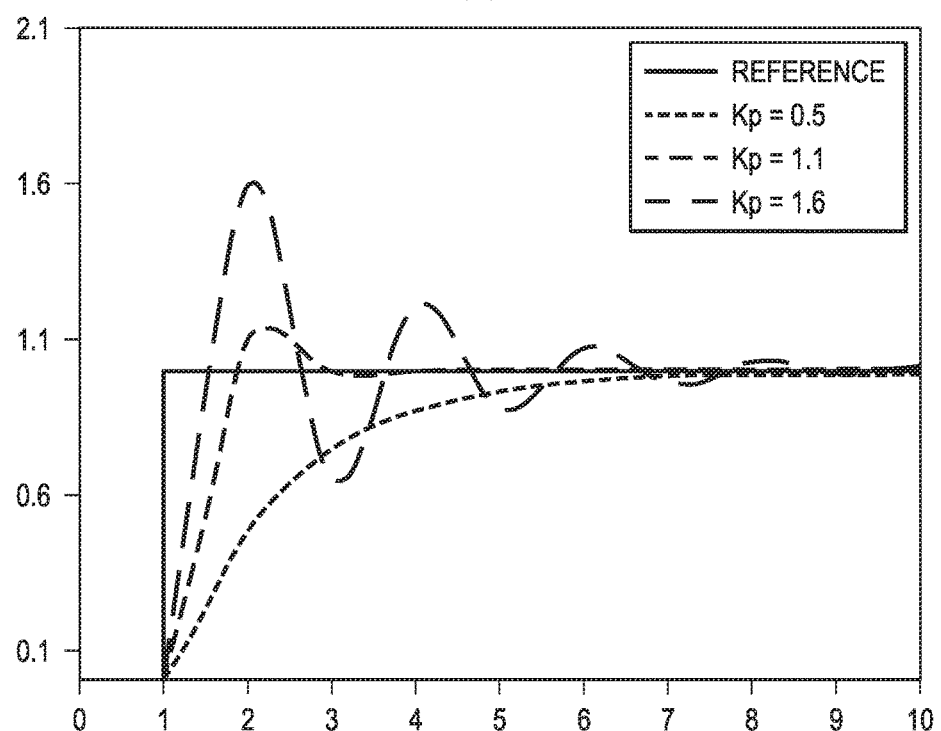
FIG. 13B is a plot of a PID controller output variable versus time, for three values of the proportional component ($K_p$)

FIG. 13B is a plot of output variable PV versus time, for three values of $K_p$ (with $K_i$ and $K_d$ held constant).

Droop

Because a non-zero error is required to drive it, a proportional controller generally operates with a steady-state error, referred to as droop or offset. Droop is proportional to the process gain and inversely proportional to proportional gain. Droop may be mitigated by adding a compensating bias term to the setpoint or output, or corrected dynamically by adding an integral term.

Integral Term

The contribution from the integral term is proportional to both the magnitude of the error and the duration of the error. The integral in a PID controller is the sum of the instantaneous error over time and gives the accumulated offset that should have been corrected previously. The accumulated error is then multiplied by the integral gain ($K_i$) and added to the controller output.

The integral term is given by:

$$I_{out} = K_i \int_0^t e(\tau) d\tau \quad (3)$$

The integral term accelerates the movement of the process towards setpoint and eliminates the residual steady-state error that occurs with a pure proportional controller. However, since the integral term responds to accumulated errors from the past, it can cause the present value to overshoot the setpoint value (see the section on loop tuning).

Figure 13C:
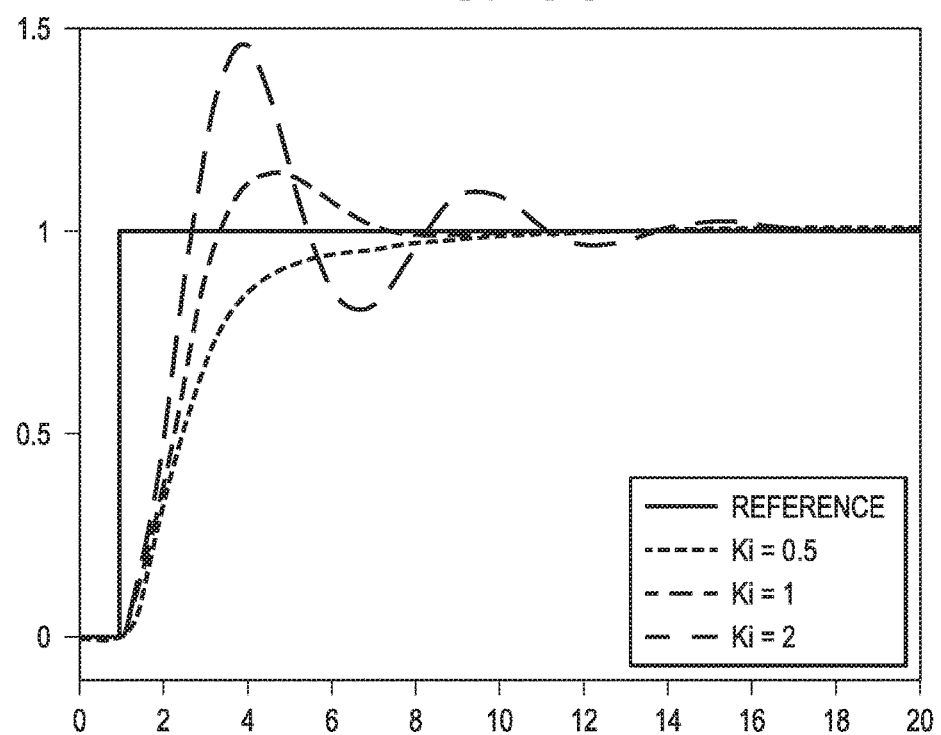
FIG. 13C is a plot of a PID controller output variable versus time, for three values of the integral component ($K_i$)

FIG. 13C is a plot of output variable PV versus time, for three values of $K_i$ (with $K_p$ and $K_d$ held constant).

Derivative Term

The derivative of the process error is calculated by determining the slope of the error over time and multiplying this rate of change by the derivative gain $K_d$. The magnitude of the contribution of the derivative term to the overall control action is termed the derivative gain, Kd.

The derivative term is given by:

$$D_{out} = K_d \frac{d}{dt} e(t) \quad (4)$$

Figure 13D:
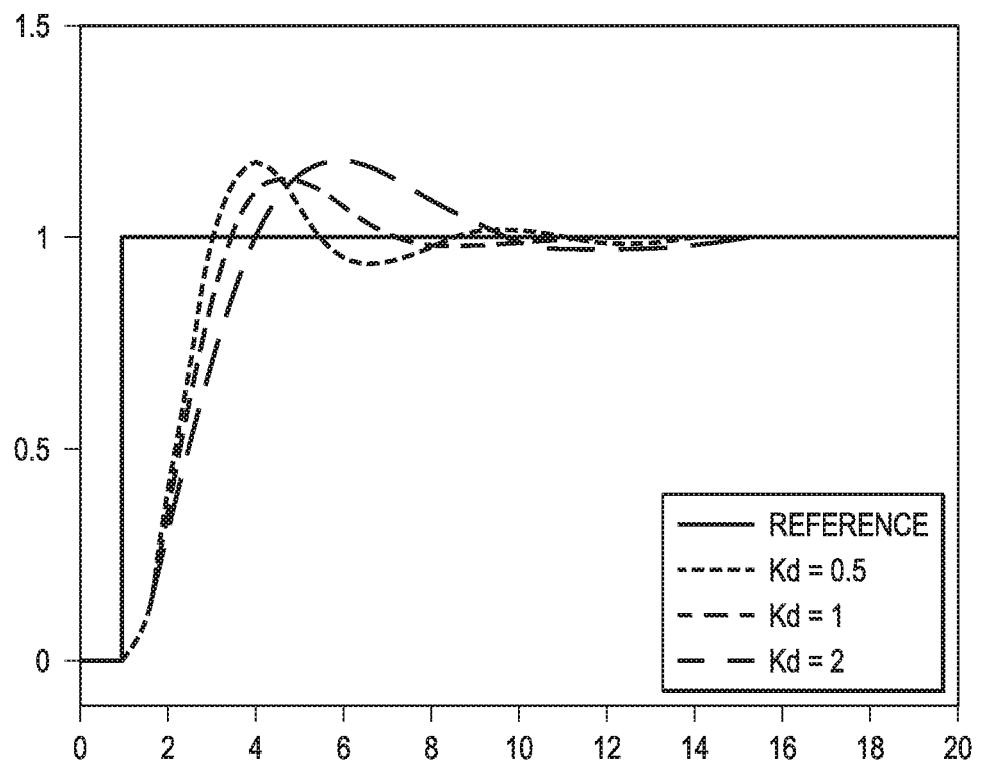
FIG. 13D is a plot of a PID controller output variable versus time, for three values of the derivative component ($K_d$)

Derivative action predicts system behavior and thus improves settling time and stability of the system. An ideal derivative is not causal, so that implementations of PID controllers include an additional low pass filtering for the derivative term, to limit the high frequency gain and noise. Derivative action is seldom used in practice though—by one estimate in only 20% of deployed controllers—because of its variable impact on system stability in real-world applications FIG. 13D is a plot of output variable PV versus time, for three values of $K_d$ (with $K_p$ and $K_i$ held constant).

Loop Tuning

Tuning a control loop is the adjustment of its control parameters (proportional band/gain, integral gain/reset, derivative gain/rate) to the optimum values for the desired control response. Stability (no unbounded oscillation) is a basic requirement, but beyond that, different systems have different behavior, different applications have different requirements, and requirements may conflict with one another.

PID tuning is a difficult problem, even though there are only three parameters and in principle is simple to describe, because it must satisfy complex criteria within the limitations of PID control. There are accordingly various methods for loop tuning, and more sophisticated techniques are the subject of patents; this section describes some traditional manual methods for loop tuning.

Designing and tuning a PID controller appears to be conceptually intuitive, but can be hard in practice, if multiple (and often conflicting) objectives such as short transient and high stability are to be achieved. PID controllers often provide acceptable control using default tunings, but performance can generally be improved by careful tuning, and performance may be unacceptable with poor tuning. Usually, initial designs need to be adjusted repeatedly through computer simulations until the closed-loop system performs or compromises as desired.

Some processes have a degree of nonlinearity and so parameters that work well at full-load conditions don't work when the process is starting up from no-load; this can be corrected by gain scheduling (using different parameters in different operating regions).

Loop Tuning: Stability

If the PID controller parameters (the gains of the proportional, integral and derivative terms) are chosen incorrectly, the controlled process input can be unstable, i.e., its output diverges, with or without oscillation, and is limited only by saturation or mechanical breakage. Instability is caused by excess gain, particularly in the presence of significant lag.

Generally, stabilization of response is required and the process must not oscillate for any combination of process conditions and setpoints, though sometimes marginal stability (bounded oscillation) is acceptable or desired Loop Tuning: Optimum behavior The optimum behavior on a process change or setpoint change varies depending on the application.

Two basic requirements are regulation (disturbance rejection—staying at a given setpoint) and command tracking (implementing setpoint changes)—these refer to how well the controlled variable tracks the desired value. Specific criteria for command tracking include rise time and settling time. Some processes must not allow an overshoot of the process variable beyond the setpoint if, for example, this would be unsafe. Other processes must minimize the energy expended in reaching a new setpoint.

Loop Tuning: Overview of Methods

There are several methods for tuning a PID loop. The most effective methods generally involve the development of some form of process model, then choosing P, I, and D based on the dynamic model parameters. Manual tuning methods can be relatively inefficient, particularly if the loops have response times on the order of minutes or longer.

The choice of method will depend largely on whether or not the loop can be taken "offline" for tuning, and on the response time of the system. If the system can be taken offline, the best tuning method often involves subjecting the system to a step change in input, measuring the output as a function of time, and using this response to determine the control parameters Loop Tuning: Manual Tuning If the system must remain online, one tuning method is to first set $K_i$ and $K_d$ values to zero. Increase the $K_p$ until the output of the loop oscillates, then the $K_p$ should be set to approximately half of that value for a "quarter amplitude decay" type response. Then increase $K_i$ until any offset is corrected in sufficient time for the process. However, too much $K_i$ will cause instability. Finally, increase $K_d$, if required, until the loop is acceptably quick to reach its reference after a load disturbance. However, too much $K_d$ will cause excessive response and overshoot. A fast PID loop tuning usually overshoots slightly to reach the setpoint more quickly; however, some systems cannot accept overshoot, in which case an over-damped closed-loop system is required, which will require a $K_p$ setting significantly less than half that of the $K_p$ setting that was causing oscillation.

TABLE 1

Effects of increasing a parameter independently

| Parameter | Rise time | Overshoot | Settling time | Steady-state error | Stability |
|---|---|---|---|---|---|
| $K_p$ | Decrease | Increase | Small change | Decrease | Degrade |
| $K_i$ | Decrease | Increase | Increase | Eliminate | Degrade |
| $K_d$ | Minor change | Decrease | Decrease | No effect in theory | Improve if $K_d$ small |

Loop Tuning: Ziegler-Nichols Method

Another heuristic tuning method is formally known as the Ziegler-Nichols method, introduced by John G. Ziegler and Nathaniel B. Nichols in the 1940s. As in the method above, the $K_i$ and $K_d$ gains are first set to zero. The proportional gain is increased until it reaches the ultimate gain, $K_u$, at which the output of the loop starts to oscillate. $K_u$ and the oscillation period $P_u$ are used to set the gains as shown:

TABLE 2

Ziegler-Nichols method

| Control Type | $K_p$ | $K_i$ | $K_d$ |
|---|---|---|---|
| P | $0.50K_u$ | — | — |
| PI | $0.45K_u$ | $1.2K_p/P_u$ | — |
| PID | $0.60K_u$ | $2K_p/P_u$ | $K_pP_u/8$ |

These gains apply to the ideal, parallel form of the PID controller. When applied to the standard PID form, the integral and derivative time parameters $T_i$ and $T_d$ are only dependent on the oscillation period $P_u$. Please see the section "Alternative nomenclature and PID forms".

PID Tuning Software

Most modern industrial facilities no longer tune loops using the manual calculation methods shown above. Instead, PID tuning and loop optimization software are used to ensure consistent results. These software packages will gather the data, develop process models, and suggest optimal tuning. Some software packages can even develop tuning by gathering data from reference changes.

Mathematical PID loop tuning induces an impulse in the system, and then uses the controlled system's frequency response to design the PID loop values. In loops with response times of several minutes, mathematical loop tuning is recommended, because trial and error can take days just to find a stable set of loop values. Optimal values are harder to find. Some digital loop controllers offer a self-tuning feature in which very small setpoint changes are sent to the process, allowing the controller itself to calculate optimal tuning values.

Other formulas are available to tune the loop according to different performance criteria. Many patented formulas are now embedded within PID tuning software and hardware modules.

Advances in automated PID Loop Tuning software also deliver algorithms for tuning PID Loops in a dynamic or Non-Steady State (NSS) scenario. The software will model the dynamics of a process, through a disturbance, and calculate PID control parameters in response.

Limitations of PID Control

While PID controllers are applicable to many control problems, and often perform satisfactorily without any improvements or only coarse tuning, they can perform poorly in some applications, and do not in general provide optimal control. The fundamental difficulty with PID control is that it is a feedback system, with constant parameters, and no direct knowledge of the process, and thus overall performance is reactive and a compromise. While PID control is the best controller in an observer without a model of the process, better performance can be obtained by overtly modeling the actor of the process without resorting to an observer.

PID controllers, when used alone, can give poor performance when the PID loop gains must be reduced so that the control system does not overshoot, oscillate or hunt about the control setpoint value. They also have difficulties in the presence of non-linearities, may trade-off regulation versus response time, do not react to changing process behavior (say, the process changes after it has warmed up), and have lag in responding to large disturbances.

The most significant improvement is to incorporate feed-forward control with knowledge about the system, and using the PID only to control error. Alternatively, PIDs can be modified in more minor ways, such as by changing the parameters (either gain scheduling in different use cases or adaptively modifying them based on performance), improving measurement (higher sampling rate, precision, and accuracy, and low-pass filtering if necessary), or cascading multiple PID controllers.

Limitations: Linearity

Another problem faced with PID controllers is that they are linear, and in particular symmetric. Thus, performance of PID controllers in non-linear systems (such as HVAC systems) is variable. For example, in temperature control, a common use case is active heating (via a heating element) but passive cooling (heating off, but no cooling), so overshoot can only be corrected slowly—it cannot be forced downward. In this case the PID should be tuned to be overdamped, to prevent or reduce overshoot, though this reduces performance (it increases settling time).

Limitations: Noise in derivative

A problem with the derivative term is that it amplifies higher frequency measurement or process noise that can cause large amounts of change in the output. It does this so much, that a physical controller cannot have a true derivative term, but only an approximation with limited bandwidth. It is often helpful to filter the measurements with a low-pass filter in order to remove higher-frequency noise components. As low-pass filtering and derivative control can cancel each other out, the amount of filtering is limited. So low noise instrumentation can be important. A nonlinear median filter may be used, which improves the filtering efficiency and practical performance. In some cases, the differential band can be turned off with little loss of control. This is equivalent to using the PID controller as a PI controller.

Modifications to the PID Algorithm

The basic PID algorithm presents some challenges in control applications that have been addressed by minor modifications to the PID form.

Modifications: Integral Windup

One common problem resulting from the ideal PID implementations is integral windup. Following a large change in setpoint the integral term can accumulate an error larger than the maximal value for the regulation variable (windup), thus the system overshoots and continues to increase until this accumulated error is unwound. This problem can be addressed by: (a) disabling the integration until the PV has entered the controllable region, (b) preventing the integral term from accumulating above or below pre-determined bounds, and/or (c) back-calculating the integral term to constrain the regulator output within feasible bounds.

Modifications: Overshooting from Known Disturbances

For example, a PID loop is used to control the temperature of an electric resistance furnace where the system has stabilized. Now when the door is opened and something cold is put into the furnace the temperature drops below the setpoint. The integral function of the controller tends to compensate this error by introducing another error in the positive direction. This overshoot can be avoided by freezing of the integral function after the opening of the door for the time the control loop typically needs to reheat the furnace.

Modifications: PI Controller

A PI Controller (proportional-integral controller) is a special case of the PID controller in which the derivative (D) of the error is not used.

FIG. 13E shows a basic block diagram of a PI controller. The controller output is given by $$K_P \Delta + K_I \int \Delta dt \qquad (5)$$

where $\Delta$ is the error or deviation of actual measured value (PV) from the setpoint (SP).

$$\Delta = SP - PV \qquad (6)$$

A PI controller can be modelled easily in software such as Simulink or Xcos using a "flow chart" box involving Laplace operators:

$$C = \frac{G(1 + \tau s)}{\tau s} \qquad (7)$$

where $G = K_{P=proportional\ gain}$ $G/\tau = K_{I=integral\ gain}$

Setting a value for G is often a trade off between decreasing overshoot and increasing settling time.

The lack of derivative action may make the system more steady in the steady state in the case of noisy data. This is because derivative action is more sensitive to higher-frequency terms in the inputs.

Without derivative action, a PI-controlled system is less responsive to real (non-noise) and relatively fast alterations in state and so the system will be slower to reach setpoint and slower to respond to perturbations than a well-tuned PID system may be.

Modifications: Deadband

Many PID loops control a mechanical device (for example, a valve). Mechanical maintenance can be a major cost and wear leads to control degradation in the form of either stiction or a deadband in the mechanical response to an input signal. The rate of mechanical wear is mainly a function of how often a device is activated to make a change. Where wear is a significant concern, the PID loop may have an output deadband to reduce the frequency of activation of the output (valve). This is accomplished by modifying the controller to hold its output steady if the change would be small (within the defined deadband range). The calculated output must leave the deadband before the actual output will change.

Modifications: Set Point Step Change

The proportional and derivative terms can produce excessive movement in the output when a system is subjected to an instantaneous step increase in the error, such as a large setpoint change. In the case of the derivative term, this is due to taking the derivative of the error, which is very large in the case of an instantaneous step change. As a result, some PID algorithms incorporate some of the following modifications:

Set point ramping. In this modification, the setpoint is gradually moved from its old value to a newly specified value using a linear or first order differential ramp function. This avoids the discontinuity present in a simple step change.

Derivative of the process variable. In this case the PID controller measures the derivative of the measured process variable (PV), rather than the derivative of the error. This quantity is always continuous (i.e., never has a step change as a result of changed setpoint). This modification is a simple case of set point weighting.

Set point weighting. Set point weighting adds adjustable factors (usually between 0 and 1) to the setpoint in the error in the proportional and derivative element of the controller. The error in the integral term must be the true control error to avoid steady-state control errors. These two extra parameters do not affect the response to load disturbances and measurement noise and can be tuned to improve the controller's set point response.

Modifications: Feed-Forward he control system performance can be improved by combining the feedback (or closed-loop) control of a PID controller with feed-forward (or open-loop) control. Knowledge about the system (such as the desired acceleration and inertia) can be fed forward and combined with the PID output to improve the overall system performance. The feed-forward value alone can often provide the major portion of the controller output. The PID controller primarily has to compensate whatever difference or error remains between the setpoint (SP) and the system response to the open loop control. Since the feed-forward output is not affected by the process feedback, it can never cause the control system to oscillate, thus improving the system response without affecting stability. Feed forward can be based on the setpoint and on extra measured disturbances. Set point weighting is a simple form of feed forward.

For example, in most motion control systems, in order to accelerate a mechanical load under control, more force is required from the actuator. If a velocity loop PID controller is being used to control the speed of the load and command the force being applied by the actuator, then it is beneficial to take the desired instantaneous acceleration, scale that value appropriately and add it to the output of the PID velocity loop controller. This means that whenever the load is being accelerated or decelerated, a proportional amount of force is commanded from the actuator regardless of the feedback value. The PID loop in this situation uses the feedback information to change the combined output to reduce the remaining difference between the process setpoint and the feedback value. Working together, the combined open-loop feed-forward controller and closed-loop PID controller can provide a more responsive control system.

Modifications: Bumpless Operation

PID controllers are often implemented with a "bumpless" initialization feature that recalculates an appropriate integral accumulator term to maintain a consistent process output through parameter changes.

Modifications: Other Improvements

In addition to feed-forward, PID controllers are often enhanced through methods such as PID gain scheduling (changing parameters in different operating conditions), fuzzy logic or computational verb logic. Further practical application issues can arise from instrumentation connected to the controller. A high enough sampling rate, measurement precision, and measurement accuracy are required to achieve adequate control performance. Another new method for improvement of PID controller is to increase the degree of freedom by using fractional order. The order of the integrator and differentiator add increased flexibility to the controller.

Cascade Control

One distinctive advantage of PID controllers is that two PID controllers can be used together to yield better dynamic performance. This is called cascaded PID control. In cascade control there are two PIDs arranged with one PID controlling the setpoint of another. A PID controller acts as outer loop controller, which controls the primary physical parameter, such as fluid level or velocity. The other controller acts as inner loop controller, which reads the output of outer loop controller as setpoint, usually controlling a more rapid changing parameter, flowrate or acceleration. It can be mathematically proven that the working frequency of the controller is increased and the time constant of the object is reduced by using cascaded PID controllers.

For example, a temperature-controlled circulating bath has two PID controllers in cascade, each with its own thermocouple temperature sensor. The outer controller controls the temperature of the water using a thermocouple located far from the heater where it accurately reads the temperature of the bulk of the water. The error term of this PID controller is the difference between the desired bath temperature and measured temperature. Instead of controlling the heater directly, the outer PID controller sets a heater temperature goal for the inner PID controller. The inner PID controller controls the temperature of the heater using a thermocouple attached to the heater. The inner controller's error term is the difference between this heater temperature setpoint and the measured temperature of the heater. Its output controls the actual heater to stay near this setpoint.

The proportional, integral and differential terms of the two controllers will be very different. The outer PID controller has a long time constant—all the water in the tank needs to heat up or cool down. The inner loop responds much more quickly. Each controller can be tuned to match the physics of the system it controls—heat transfer and thermal mass of the whole tank or of just the heater—giving better total response.

Pseudocode

Below is a simple software loop that implements a PID algorithm:

```
previous_error=0
integral=0
start:
error=setpoint−measured_value
integral=integral+error*dt
derivative=(error−previous_error)/dt
output=Kp*error+Ki*integral+Kd*derivative
previous_error=error
wait(dt)
goto start
```

In this example, two variables that will be maintained within the loop are initialized to zero, then the loop begins. The current error is calculated by subtracting the measured_value (the process variable or PV) from the current setpoint (SP). Then, integral and derivative values are calculated and these and the error are combined with three preset gain terms—the proportional gain, the integral gain and the derivative gain—to derive an output value. In the real world, this is D to A converted and passed into the process under control as the manipulated variable (or MV). The current error is stored elsewhere for re-use in the next differentiation, the program then waits until dt seconds have passed since start, and the loop begins again, reading in new values for the PV and the setpoint and calculating a new value for the error.

The invention claimed is:

1. A method for dynamically controlling the pace of impression delivery among multiple geographic regions in a network-based real-time bidding (RTB) system, the method comprising:
    identifying, by a bidding system, one or more target geographic locations associated with a particular campaign;
    identifying, by the bidding system, one or more target geographic regions associated with each target geographic location;
    determining, by the bidding system, a target impression volume for each target geographic region associated with the particular campaign, wherein the target impression volume for each target geographic region specifies a target number of impressions related to the particular campaign to be delivered to that target geographic region in a defined time period;
    determining, by the bidding system, a pacing score for each target geographic region associated with each target geographic location;
    receiving a series of RTB bid requests at the bidding system from an RTB exchange via a communications network, each RTB bid request including (a) placement information identifying an online placement in digital content being loaded or rendered by an end user device and (b) identification information;
    for each received RTB bid request, executing a bidding algorithm including:
        identifying a geographic region associated with the bid request based on the identification information in the bid request;
        determining whether the identified geographic region is a target geographic region for the particular campaign;
        if the identified geographic region is a target geographic region for the particular campaign, determining whether to submit a bid based at least on the pacing score for the identified geographic region;
    wherein winning bids are submitted for at least one received RTB bid request, each winning bid resulting in an impression delivery to a respective end user device;
    storing, by the bidding system, impression delivery data for at least one target geographic region for the particular campaign, the stored impression delivery data indicating a volume of impressions delivered to each respective target geographic region;
    automatically adjusting, by the bidding system, the pacing score for a particular target geographic region based on the stored impression delivery data for the particular target geographic region by:
        accessing impression delivery data for the particular target geographic region indicating a number of impressions related to the particular campaign that have been delivered to the particular target geographic region;
        accessing the target impression volume for the particular target geographic region;
        executing a proportional-integral-derivative (PID) controller or a proportional-integral (PI) controller to determine adjustments to the pacing score based on (a) a current value of the pacing score, (b) the accessed impression delivery data for the particular target geographic region, and (c) the target impression volume for the particular target geographic region;
    receiving, by the bidding system, a subsequent RTB bid request associated with the particular target geographic region; and
    determining, by the bidding system, whether to submit a bid on the subsequent RTB bid request based at least on the adjusted pacing score for the target geographic region.

2. The method of claim 1, wherein identifying, by the bidding system, one or more target geographic regions associated with each target geographic location comprises:
    identifying a set of proximate geographic regions having a defined geographic relationship with the respective target geographic location;
    identifying demographic information associated with each proximate geographic region; and
    selecting, from the set of proximate geographic regions, one or more target geographic regions for the particular campaign, based on the identified demographic information associated with each proximate geographic region.

3. The method of claim 1, wherein determining a pacing score for each target geographic region associated with each target geographic location comprises selecting different pacing scores for at least two different target geographic regions associated with a particular target geographic location.

4. The method of claim 1, wherein each target geographic location comprises a physical store location.

5. The method of claim 1, wherein the bidding algorithm for each received RTB bid request associated with one of the target geographic regions includes:
    identifying a geographic region associated with the bid request based on the identification information in the bid request;
    determining that the identified geographic region is a target geographic region for the particular campaign;
    accessing the pacing score for the identified geographic region;
    determining at least one additional score selected from the group consisting of (a) a user score corresponding to a user associated with the particular bid request, and (b) a placement score corresponding to the placement identified in the bid request;
    calculating an overall bid score for the bid request based at least on (a) the pacing score for the identified geographic region and (b) the at least one additional score;
    comparing the overall bid score to a threshold value; and
    submitting a bid if the overall bid score meets or exceeds the threshold value.

6. The method of claim 5, wherein the threshold value comprises a dynamically adjusted pacing threshold value.

7. The method of claim 6, comprising dynamically adjusting, by the bidding system, the pacing threshold value using a proportional-integral-derivative (PID) controller or a proportional-integral (PI) controller.

8. The method of claim 1, comprising:
determining a target impression volume for each target geographic location associated with the particular campaign;
distributing the target impression volume for each target geographic location among the target geographic regions associated with that target geographic location, to thereby define a target impression volume for each target geographic region associated with each target geographic location; and
determining the pacing score for each target geographic region associated with each target geographic location based on the target impression volume defined for each respective target geographic region.

9. The method of claim 1, comprising automatically adjusting, by the bidding system, the pacing scores for one or more target geographic region based on performance feedback associated with at least one target geographic location by:
receiving performance feedback associated with at least one target geographic location;
adjusting the target impression volume for each of the at least one target geographic location based on the received performance feedback;
for each target geographic location having an adjusted target impression volume, adjusting the target impression volume for each target geographic region associated with that target geographic location; and
for each target geographic region having an adjusted target impression volume, adjusting the pacing score for that target geographic region based on the adjusted target impression volume.

10. The method of claim 9, wherein the performance feedback associated with at least one target geographic location comprises sales data from at least one store.

11. A bidding system for dynamically controlling the pace of impression delivery among multiple geographic regions in a network-based real-time bidding (RTB) system, comprising:
at least one processor; and
computer-readable instructions stored in non-transitory computer readable medium and executable by the at least one processor to:
identify one or more target geographic locations associated with a particular campaign;
identify one or more target geographic regions associated with each target geographic location;
determine a target impression volume for each target geographic region associated with the particular campaign, wherein the target impression volume for each target geographic region specifies a target number of impressions related to the particular campaign to be delivered to that target geographic region in a defined time period;
determine a pacing score for each target geographic region associated with each target geographic location;
receive a series of RTB bid requests from an RTB exchange via a communications network, each RTB bid request including (a) placement information identifying an online placement in digital content being loaded or rendered by an end user device and (b) identification information;
for each received RTB bid request, execute a bidding algorithm including:
identifying a geographic region associated with the bid request based on the identification information in the bid request;
determining whether the identified geographic region is a target geographic region for the particular campaign;
if the identified geographic region is a target geographic region for the particular campaign, determining whether to submit a bid based at least on the pacing score for the identified geographic region;
wherein winning bids are submitted for at least one received RTB bid request, each winning bid resulting in an impression delivery to a respective end user device;
store impression delivery data at least one target geographic region for the particular campaign, the stored impression delivery data indicating a volume of impressions delivered to each respective target geographic region;
adjust the pacing score for a particular target geographic region based on the stored impression delivery data for the particular target geographic region by:
accessing impression delivery data for the particular target geographic region indicating a number of impressions related to the particular campaign that have been delivered to the particular target geographic region;
accessing the target impression volume for the particular target geographic region;
executing a proportional-integral-derivative (PID) controller or a proportional-integral (PI) controller to determine adjustments to the pacing score based on (a) a current value of the pacing score, (b) the accessed impression delivery data for the particular target geographic region, and (c) the target impression volume for the particular target geographic region;
receive a subsequent RTB bid request associated with the particular target geographic region; and
determine whether to submit a bid on the subsequent RTB bid request based at least on the adjusted pacing score for the target geographic region.

* * * * *